United States Patent
Oshidari et al.

(10) Patent No.: US 7,004,868 B2
(45) Date of Patent: *Feb. 28, 2006

(54) DRIVETRAIN FOR A VEHICLE

(75) Inventors: Toshikazu Oshidari, Yokosuka (JP);
Masaki Nakano, Yokohama (JP);
Keyvan Kargar, Paris (FR); Joel
Poupon, Paris (FR)

(73) Assignees: Nissan Motor Co., Ltd., Yokohama
(JP); Renault SA, Boulogne Bilancourt
(FR)

( * ) Notice: Subject to any disclaimer, the term of this patent is extended or adjusted under 35 U.S.C. 154(b) by 59 days.

This patent is subject to a terminal disclaimer.

(21) Appl. No.: 10/200,557

(22) Filed: Jul. 23, 2002

(65) Prior Publication Data
US 2003/0064847 A1 Apr. 3, 2003

(30) Foreign Application Priority Data
Jul. 23, 2001 (JP) .................................. 2001-221222
Jul. 23, 2001 (JP) .................................. 2001-221226

(51) Int. Cl.
F16H 3/72 (2006.01)

(52) U.S. Cl. .......................................................... 475/5
(58) Field of Classification Search .................. 425/5; 475/5; 477/5
See application file for complete search history.

(56) References Cited

U.S. PATENT DOCUMENTS

| 1,515,321 | A | | 11/1924 | Ahlm et al. |
| 5,558,589 | A | | 9/1996 | Schmidt |
| 5,931,757 | A | | 8/1999 | Schmidt |
| 5,935,035 | A | * | 8/1999 | Schmidt .......................... 475/5 |
| 6,022,287 | A | | 2/2000 | Klemen et al. |
| 6,053,833 | A | | 4/2000 | Masaki |
| 6,090,005 | A | | 7/2000 | Schmidt et al. |
| 6,371,878 | B1 | * | 4/2002 | Bowen ............................ 475/5 |
| 6,579,201 | B1 | * | 6/2003 | Bowen ............................ 475/5 |

FOREIGN PATENT DOCUMENTS

| DE | 196 06 771 A1 | 8/1997 |
| DE | 198 41 829 A1 | 3/2000 |
| DE | 199 09 424 A1 | 8/2000 |
| DE | 199 16 489 A1 | 10/2000 |
| EP | 1 092 583 A1 | 4/2001 |
| EP | 1 106 412 A2 | 6/2001 |
| FR | 2 781 727 A1 | 2/2000 |
| JP | 50-85019 | 7/1975 |
| JP | 2000-142146 A | 5/2000 |
| JP | 2000-355224 A | 12/2000 |
| JP | 2001-190006 A | 7/2001 |
| WO | WO 00/32433 A1 | 8/2000 |
| WO | WO 01/25049 A1 | 4/2001 |

* cited by examiner

Primary Examiner—Dirk Wright
(74) Attorney, Agent, or Firm—Foley & Lardner LLP

(57) ABSTRACT

The drivetrain includes a differential mechanism having four or more input/output elements and having two degrees of freedom. The input In from an engine, the output Out to a drive shaft, and two motor-generators MGi and MGo are assigned to the elements, and one of the elements other than the element to which the output assigned is provided with brakes B. By braking the element other than the output with the brakes, a large reduction ratio can be achieved, so startability can be improved without enlarging the capacities of the motor-generators.

2 Claims, 20 Drawing Sheets

DRIVETRAIN FOR A VEHICLE

FIELD OF THE INVENTION

The present invention relates to a drivetrain for a hybrid vehicle including an engine and a motor and, more particularly, to a drivetrain which performs a continuously variable speed change by a differential mechanism such as a planetary gear mechanism.

BACKGROUND OF THE INVENTION

JP2000-142146A published by the Japanese Patent Office in 2000 discloses a drivetrain for a hybrid vehicle which is constructed by connecting a generator, an engine and a motor for driving a vehicle to a sun gear, a planetary carrier and a ring gear of a planetary gear mechanism. According to this drivetrain, the continuously variable speed change and the increase or decrease of the output torque can be performed by using the differential function of the gears to distribute the engine output partially to the generator and supplying the generated electric power to the motor.

SUMMARY OF THE INVENTION

In this drivetrain using the three-component planetary gear mechanism, however, it is difficult to increase the energy passing through the planetary gears due to mechanical restrictions. This difficulty makes it necessary to enlarge the generator and the motor. Especially, the ratio of the power passing through the generator and the motor, to the power passing through the differential mechanism approaches a value of 1 at a lower speed and cannot be increased. For retaining a sufficient driving force at a starting time, therefore, the generator and the motor are required to have outputs as large as that of the engine. Thus, the size and weight of the drivetrain increase and the efficiency of the drivetrain decreases.

It is therefore an object of the present invention to provide a drivetrain which is enabled to have a large driving force from a stationary state by providing a two-freedom-degree differential mechanism including three or more elements with a brake.

In order to achieve above object, this invention provides a drivetrain for transmitting driving force from an engine to a drive shaft of a vehicle, comprising a planetary gear mechanism including first to fifth rotational elements arrayed on an alignment chart, the first rotational element being connected to an output shaft of the engine and the second rotational element being connected to the drive shaft, a first motor-generator connected to the fourth rotational element, a second motor-generator connected to the third rotational element, and a brake which brakes one rotational element other than the second rotational element.

The details as well as other features and advantages of this invention are set forth in the remainder of the specification and are shown in the accompanying drawings.

DESCRIPTION OF THE PREFERRED EMBODIMENTS

Figure 1A:
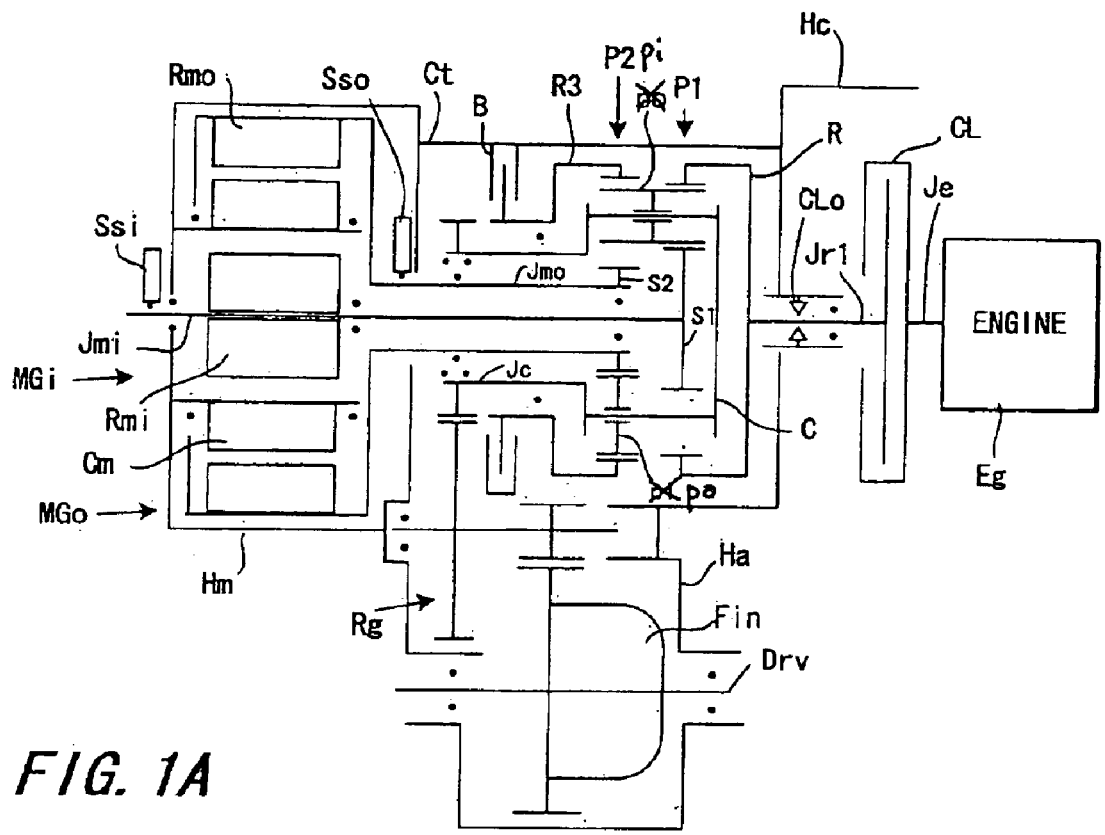
FIG. 1A is a schematic construction diagram of a first embodiment of the present invention and FIG. 1B is its alignment chart.
Figure 1B:
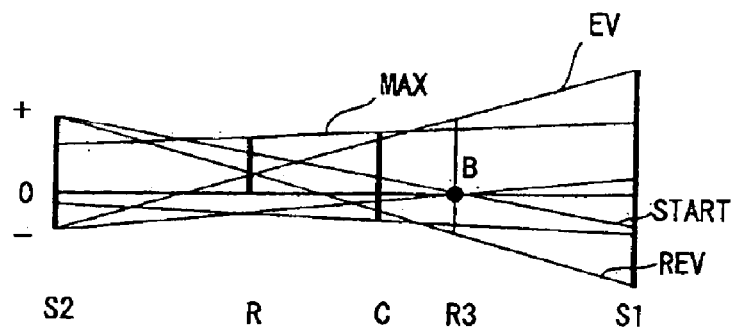

With reference to the accompanying drawings, embodiments in which the present invention is applied to a drivetrain for a front-wheel drive vehicle will be described. FIGS. 1A and 1B and succeeding figures show the schematic constructions and their alignment charts of different embodiments. Firstly, the embodiment of FIGS. 1A and 1B will be described in detail with respect to its construction, and the remaining embodiments will be described only with respect to points of difference. The common members among the individual embodiments will be designated by common reference numerals.

FIGS. 1A and 1B: Embodiment 1 (5 elements—1 Brake)

In FIGS. 1A and 1B, reference letters Hm designate a motor housing, Ct a transmission casing, Hc a clutch housing, and Ha an axle housing. The clutch housing Hc is provided with a clutch CL for coupling or decoupling an output shaft Je of an engine Eg and a transmission input shaft Jr1. A single-pinion planetary gear train P1 and a double-pinion planetary gear train P2 are connected to share their ring gears R and carriers C (composite planetary gear mechanism) and are housed in the casing Ct. The input shaft Jr1, to which the clutch CL is connected, is the ring gear shaft of the planetary gear train P1. The input shaft Jr1 is equipped with a one-way clutch CLo for preventing the reverse rotation of the engine Eg. Here, in the reference numerals designating the components of the planetary gear trains P1 and P2, the suffix numeral 1 designates the components of the first planetary gear train P1, and the suffix numeral 2 designates the components of the second planetary gear train P2. Moreover, the planetary gear train P2 of the double pinion type is expressed (as in the following construction diagrams) in diagrams expanded conveniently in a section extending through the two pinion shafts.

In the motor housing Hm, there are coaxially supported an inner rotor Rmi and an annular outer rotor Rmo, by which compact electric machines are constructed to act as two motor-generators MGi and MGo. Between the inner and outer rotors Rmi and Rmo, there is interposed an annular coil Cm, by which the rotors Rmi and Rmo can be respectively actuated as a generator or motor. An inner rotor shaft Jmi is connected to a sun gear S1 of the planetary gear train P1 through a hollow outer rotor shaft Jmo, and the outer rotor shaft Jmo is connected to a sun gear S2 of the planetary gear train P2. Letters Ssi and Sso in FIG. 1A designate rotation speed sensors for detecting the rotation speeds of the inner rotor shaft Jmi and the outer rotor shaft Jmo respectively. Here, in the reference numerals designating the components of the motor-generators MGi and MGo, the suffix letter i designates the components of the first motor-generator MGi, and the suffix letter o designates the components of the second motor-generator MGo.

The axle housing Ha is connected to the side face of the transmission casing Ct. In the axle housing Ha, a final reduction mechanism Fin and a drive shaft Drv are supported in parallel with the planetary gear trains P1 and P2. The rotation of the carrier C is transmitted to the final reduction mechanism Fin through a reduction gear Rg. In this case, a carrier shaft Jc is an output shaft connected to the drive shaft Drv via the final reduction mechanism Fin.

A ring gear R3 which is supported coaxially with the ring gear R of the planetary gear train P1 meshes with large diameter outer pinions po meshing with the sun gear S2 and inner pinions pi of the planetary gear train P2. A brake B for braking the rotation of the ring gear R3 is mounted in the casing Ct.

By braking the ring gear R3 with the brake B, the ratio of the input rotation speed relative to the output rotation speed becomes large, i.e., a large speed ratio can be obtained, as illustrated in the alignment chart of FIG. 1B, so the driving force and the starting performance from a stop state can be improved. In the alignment chart of FIG. 1B, reference letters EV designate characteristics while running only by the motor-generators MGi and MGo, START characteristics at the starting time with the brake B being applied, MAX characteristics at the maximum vehicle speed, and REV characteristics while reverse running. Moreover, reference letters Out designate the output to the drive shaft Drv, and letters In designate the input from the engine Eg.

The alignment chart will be described hereafter. In the alignment chart, the tooth number is distributed on an abscissa whereas the rotation speed of each element is expressed on an ordinate at a point distributed at a tooth number ratio, and the rotation speeds of the elements always take linear relations proportional to the tooth ratio. If two sets of planetary gear trains are combined by sharing a ring gear and a carrier of the first planetary gear train P1 with a ring gear and a carrier of the second planetary gear train P2, as in this embodiment, the elements to be connected to the input/output sides are four (or five if the ring gear R3 is added): the sun gear S1 of the first planetary gear train P1; the sun gear S2 of the second planetary gear train P2; and the carrier C and the ring gear R shared between the planetary gear trains P1 and P2. This composite planetary gear mechanism is known as a Ravineaux planetary gear train. This composite planetary gear mechanism has two degrees of freedom. That is, if the rotation speeds of any two elements are determined, the rotation speeds of the remaining two elements are determined.

If the input from the engine Eg and the output to the drive shaft Drv are assigned to any two of the four elements other than the ring gear R3 and if the motor-generators MGi and MGo are connected to the remaining two elements, there are many combinations of the speeds of the two motor-generators MGi and MGo which achieves a certain ratio between the input rotation speed and output speed ratio. From these combinations, therefore, there can be selected the combination which can minimize the energy supported by the motor-generators MGi and MGo. Especially in the present embodiment, an input In from the engine Eg and an output Out to the drive shaft Drv are assigned to the two elements on the inner side of the alignment chart, and motor-generators MGo and MGi are connected to the two elements on the outer sides. Therefore, the torque supported by the motor-generators MGi and MGo with respect to the engine output, that is, the energy passing through the motor-generators MGi and MGo can be made lower to improve the transmission efficiency of the drivetrain.

In the state where the ring gear R3 (fifth element) is being braked by the brake B, the drivetrain functions as a reduction mechanism for decelerating and transmitting the rotations from the three drive sources to the carrier C connected to the drive shaft Drv, as illustrated by START of the alignment chart FIG. 1B. Therefore, a satisfactory starting performance can be retained by the power source of a relatively small output.

More specifically, at the forward running time, in the brake-on state having the ring gear R3 braked, a forward torque is generated at the output Out, if the second motor-generator MGo generates torque in the forward direction, the engine (the input In) generates torque in the forward direction, and the first motor-generator MGi generated in the reverse direction. The torque at this time is increased and transmitted from the two motor-generators MGi and MGo and the input In to the output Out so that a large driving force is obtained.

If the output rotation speed is raised when the brake B is applied, the rotation speeds of two motor-generators MGi and MGo and the engine Eg become high, so the rotation speed of the output Out cannot be sufficiently raised due to their rotation speed limits. In this case, by releasing the brake B to allow the ring gear R3 to rotate and by changing the rotation of the first motor-generator MGi from the reverse rotation to the stop position or to the forward rotation, the output rotation speed can be raised without raising the rotation speed of the input In.

Although the maximum driving force which can be generated is larger in the brake-on state than in the brake-off state, the driving force characteristics can be smoothed by controlling the output torque of the motor-generators to reduce the variation in the driving force at a shift from the brake-on state to the brake-off state.

In the brake-on state, the torque can be transmitted to the output Out if any of drive sources generates torque, and the two motor-generators MGi and MGo may be set in an idle state.

In the brake-off state, one motor-generator generates the electric power and the other motor-generator is driven by this generated power. By controlling the rotation speeds and torques of the two motor-generators MGi and MGo sufficiently at this time, various speed ratios (i.e., the ratio between the rotation speed of the input In and the speed of the output Out) can be achieved (as referred to MAX or the like in the alignment chart) while the power generation and power consumption are balanced. By increasing the output to the drive shaft, it is possible to obtain an output larger than the engine power.

Further, in the brake-off state, there are two drive points, at which the rotation speed of the first or second motor-generator becomes zero. At these drive points, the vehicle can run without transmitting the power electrically. At drive points between these two drive points, the ratio of the power to be electrically transmitted in a lower efficiency than that of the mechanical transmission, to the power to be transmitted by the drivetrain can be reduced. Thus, the transmission efficiency of the drivetrain can be improved.

The two motor-generators MGi and MGo can be used for running the vehicle. At this time, by releasing the clutch CL, the vehicle can be driven with low friction without the engine Eg.

At the reverse running time, in the brake-on state, the torque in reverse direction can be generated in the output Out if the second motor-generator MGo generates torque in the reverse direction and the first motor-generator MGi generates torque in the forward direction. If the output is reversed, the engine rotation is also reversed, so the clutch CL is then released. In this case, the one-way clutch CLo for preventing the reverse rotation is unnecessary and may be omitted.

The EV running can be made by driving the two motor-generators MGi and MGo in the reverse direction with both the brake B and the clutch CL being released. In the clutch-on but brake-off state, the power generation and power consumption can be balanced by driving the first motor-generator MGi in the reverse direction and by generating the electric power by the second motor-generator MGo.

Figure 2:
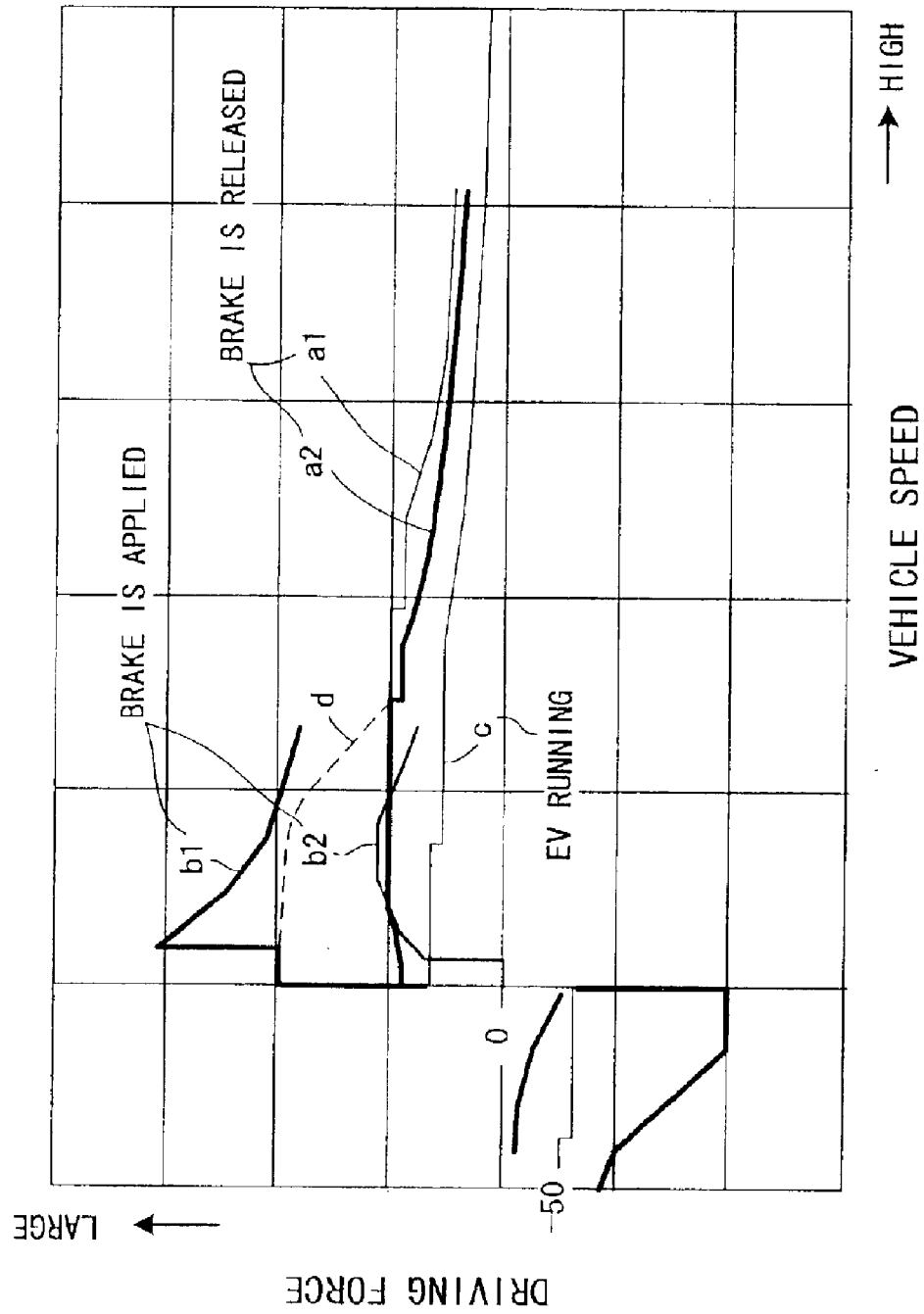
FIG. 2 is a characteristic diagram illustrating the maximum driving force characteristics in the various states according to the embodiment.
Figure 3:
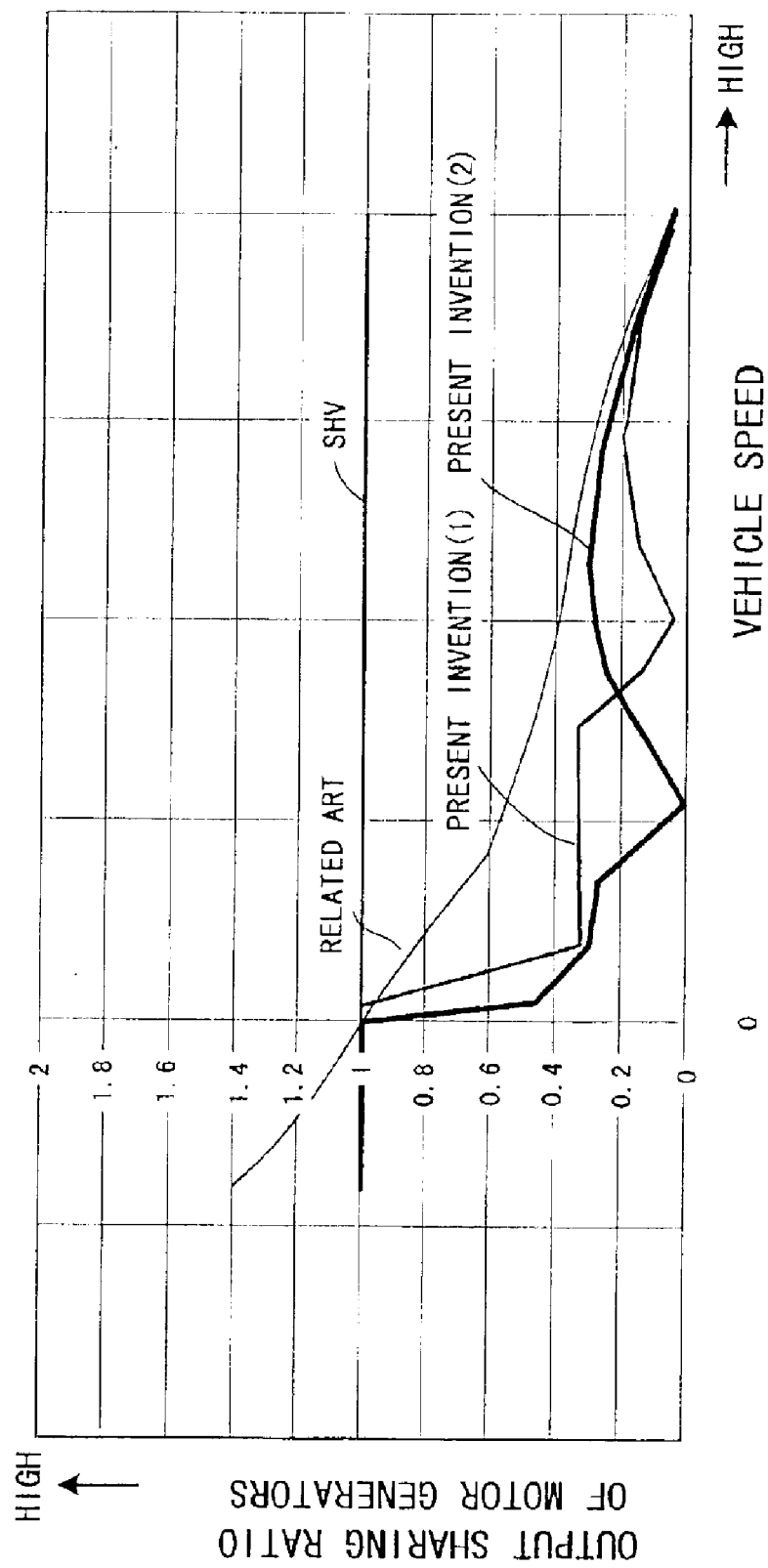
FIG. 3 is a characteristic diagram illustrating the characteristics of an output sharing ratio of motor-generators according to the embodiment, with respect to vehicle speed.

FIG. 2 illustrates the maximum driving force in the various states of the case in which the aforementioned structure is applied to the hybrid vehicle, and FIG. 3 illustrates the ratio (i.e., the output sharing ratio) of the power through the motor-generators relative to the power transmitted by the drivetrain in the state where the power generation and power consumption are balanced. In FIG. 2, curves a1 and a2 illustrate the maximum driving force characteristics of the case where the battery power is used and not used when the brake B is released. On the other hand, curves b1 and b2 illustrate the maximum driving force characteristics of the case where the battery power is used and not used when the brake B is applied. As illustrated, a large driving force is obtained in a low speed range including the start by applying the brake B. Here, curve c illustrates the maximum driving force characteristics in the EV running, and curve d illustrates the driving force characteristics of the case where the driving force is controlled to change smoothly.

The "PRESENT INVENTION (1)" and the "PRESENT INVENTION (2)" in FIG. 3 are different from each other only in the settings of the final reduction ratio of the vehicle, and the vehicle can run in most vehicle speed ranges in either case at the output sharing ratio of 30% or less of the motor-generators. From these figures, it is found that motor-generators MGo and MGi of a lower output can be applied according to the present invention to improve the transmission efficiency in comparison to the related art where the present invention is not applied. Here, the letters SHV in FIG. 3 designate the case of a series hybrid vehicle, which is always given an output sharing ratio of 1 because the engine output is wholly used for driving the generator.

FIGS. 4A, 4B to 7A, 7B: Embodiments 2 to 5

FIGS. 4A, 4B to 7A, 7B show other embodiments on the drivetrain having a construction, in which one element is provided with the brake in the differential mechanism having the five elements like that of FIG. 1A. The following description will be made mainly on the portions different from those of FIG. 1A.

Figure 4A:
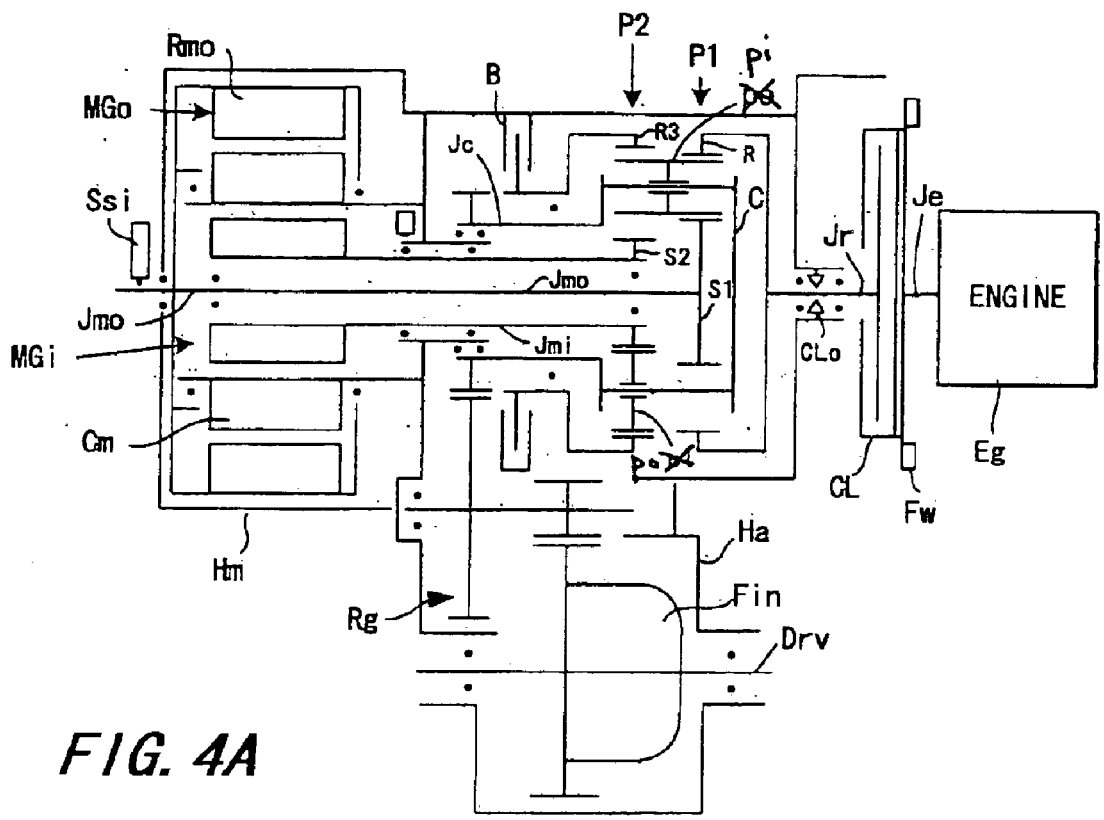
FIG. 4A is a schematic construction diagram of the second embodiment of the present invention and FIG. 4B is its alignment chart.
Figure 4B:
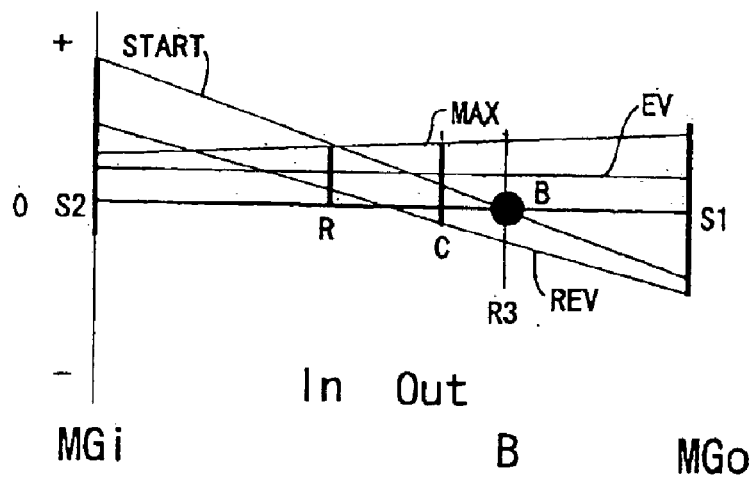

In the second embodiment shown in FIGS. 4A and 4B, the sun gear S1 of the planetary gear train P1 is connected to the outer rotor shaft Jmo, and the sun gear S2 of the planetary gear train P2 is connected to the inner rotor shaft Jmi. Here, reference letters Fw in FIG. 4 designate a flywheel of the engine Eg.

Figure 5A:
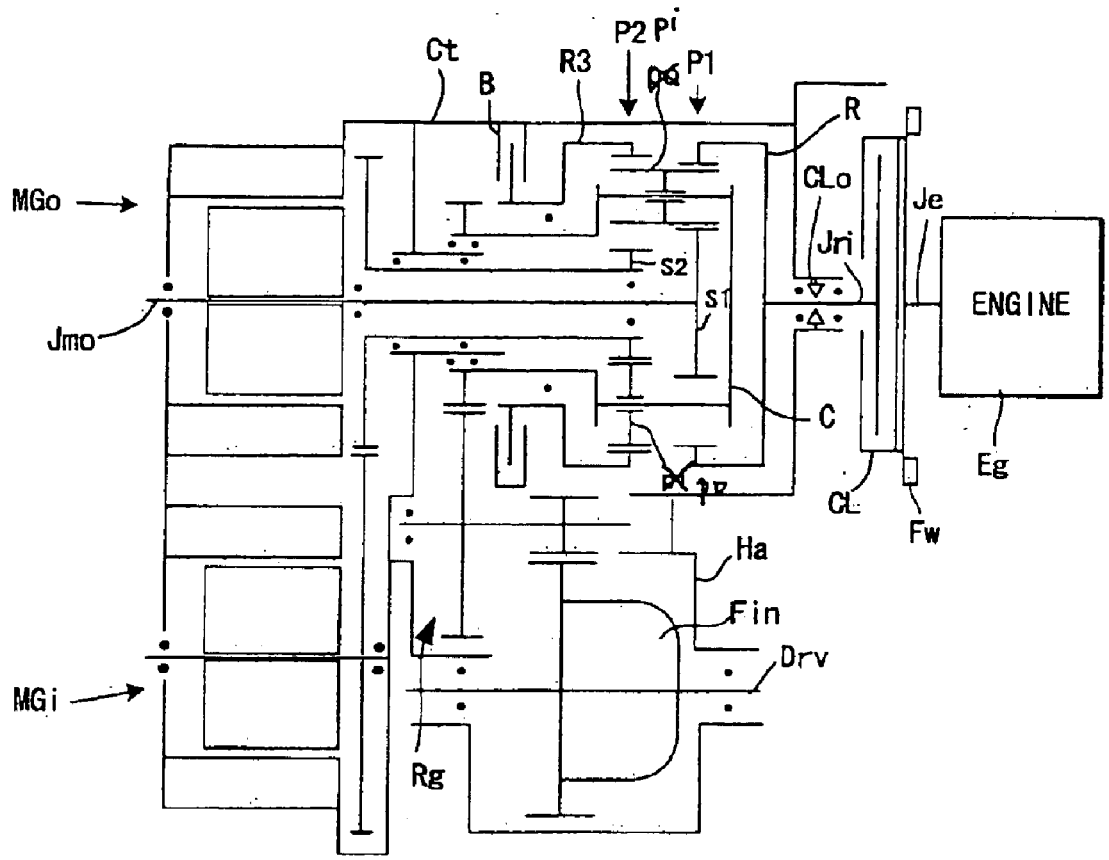
FIG. 5A is a schematic construction diagram of the third embodiment of the present invention and FIG. 5B is its alignment chart.
Figure 5B:
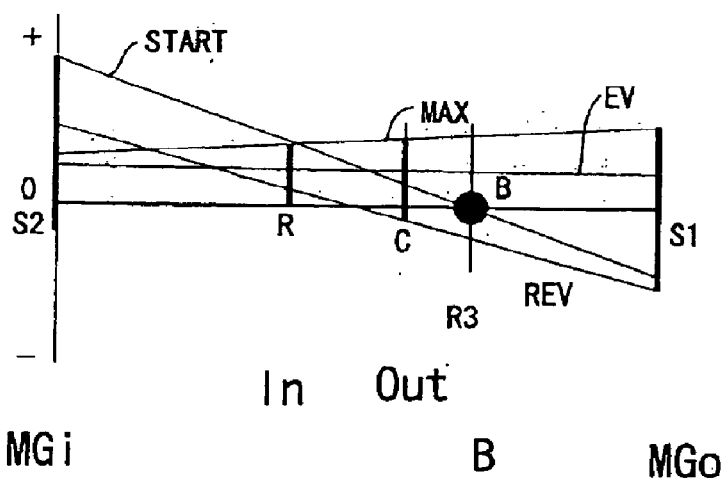

The third embodiment shown in FIGS. 5A and 5B is provided with the two motor-generators MGi and MGo independent of each other.

Figure 6A:
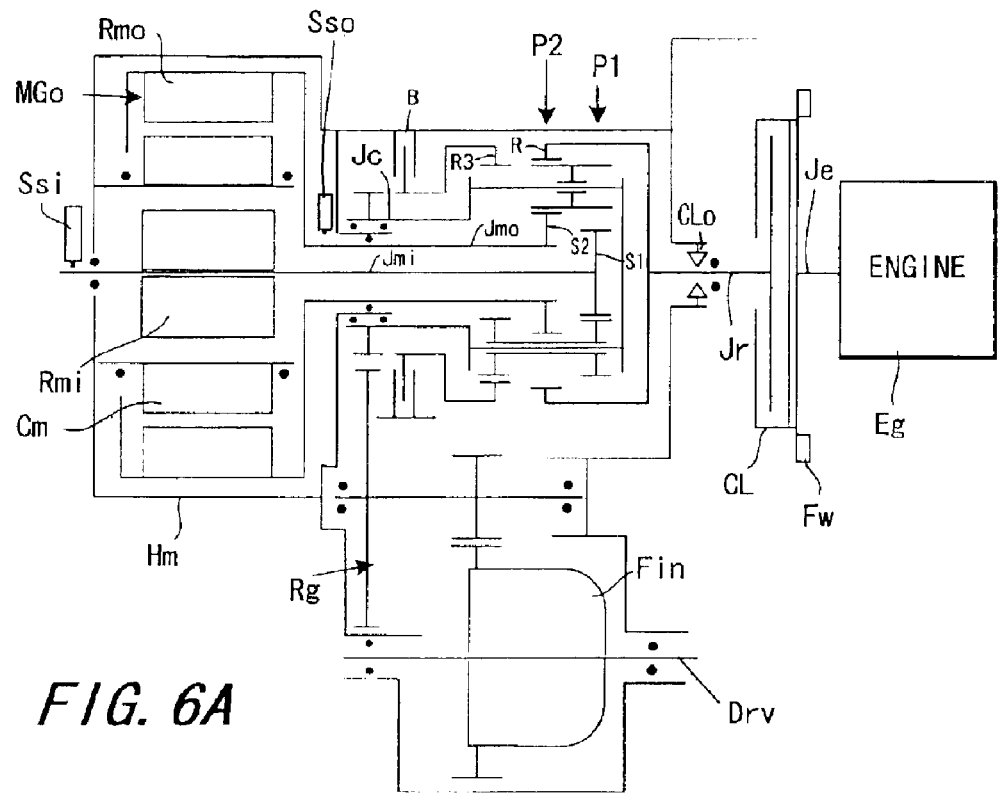
FIG. 6A is a schematic construction diagram of the fourth embodiment of the present invention
Figure 6B:
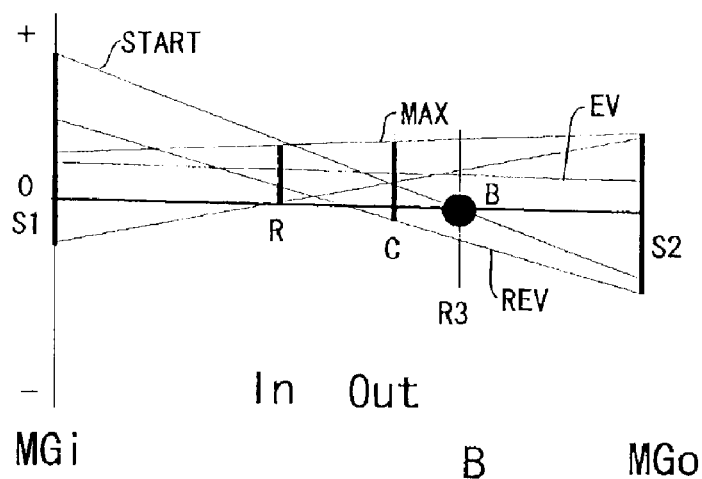
FIG. 6B is its alignment chart.

In the fourth embodiment shown in FIGS. 6A and 6B, the first planetary gear train P1 having the sun gear S1 connected to the inner rotor shaft Jmi is of a double-pinion type, and the second planetary gear train P2 having the sun gear S2 connected to the outer rotor shaft Jmo is of a single-pinion type.

Figure 7A:
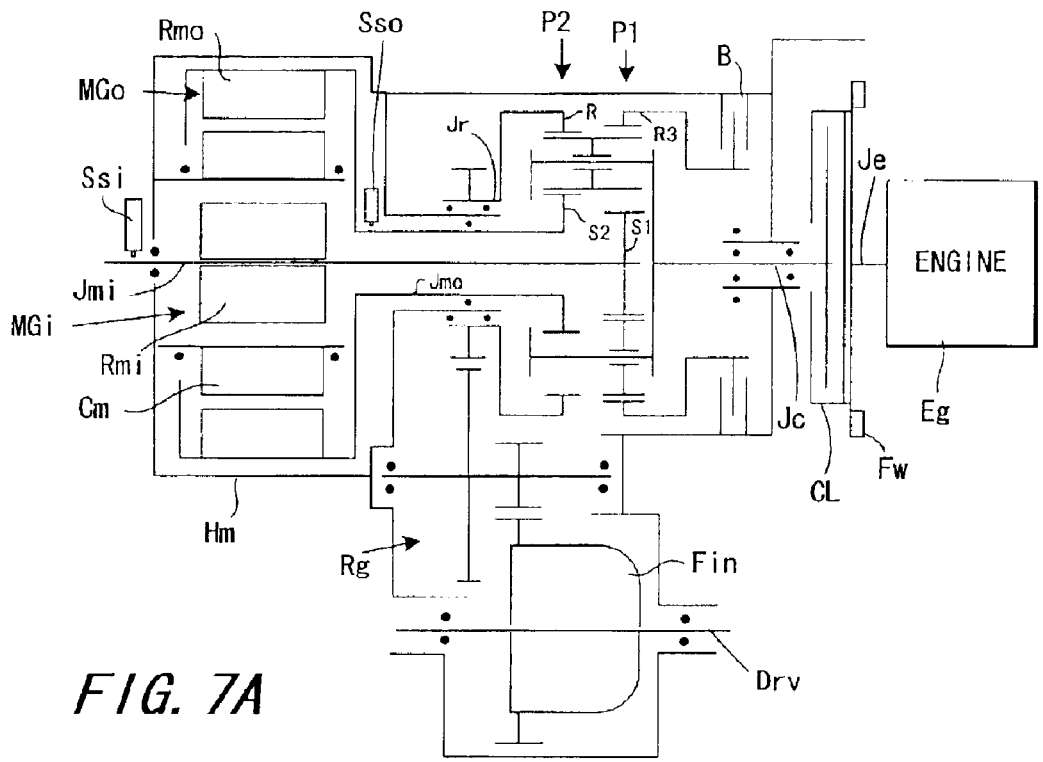
FIG. 7A is a schematic construction diagram of the fifth embodiment of the present invention and FIG. 7B is its alignment chart.
Figure 7B:
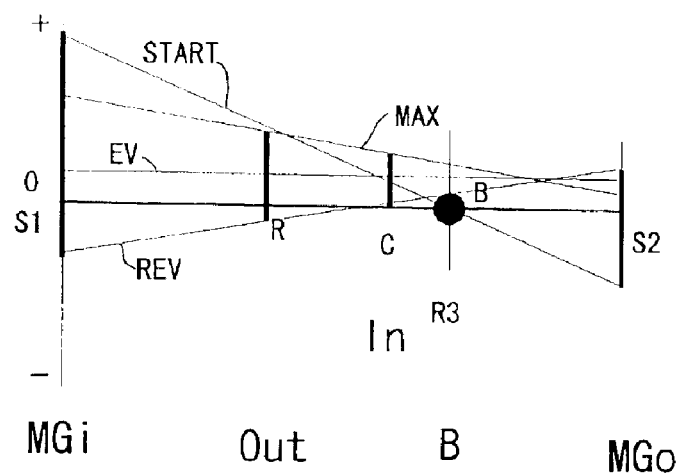

In the fifth embodiment shown in FIGS. 7A and 7B, the carrier shaft Jc is the input shaft connected to the engine output shaft Je via the clutch CL, and the ring gear shaft Jr is the output shaft connected to the final reduction mechanism Fin via the reduction gear Rg.

Figure 8A:
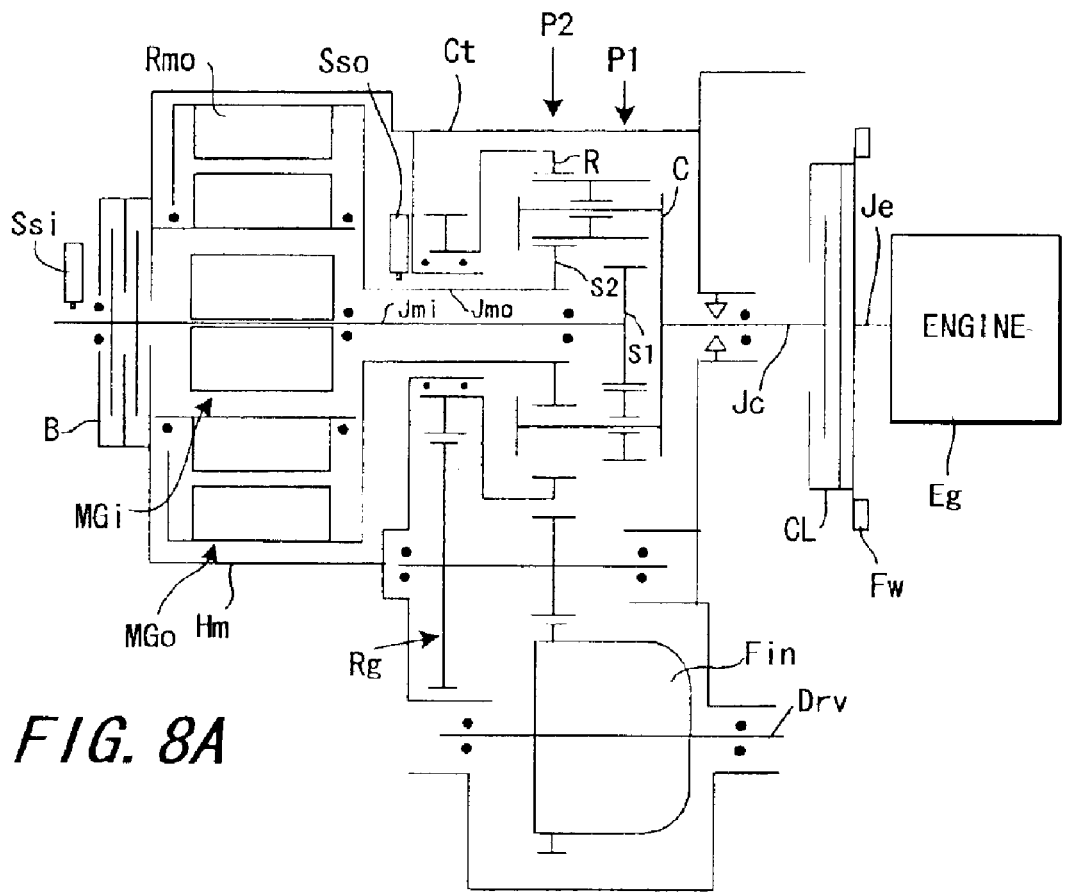
FIG. 8A is a schematic construction diagram of the sixth embodiment of the present invention and FIG. 8B is its alignment chart.
Figure 8B:
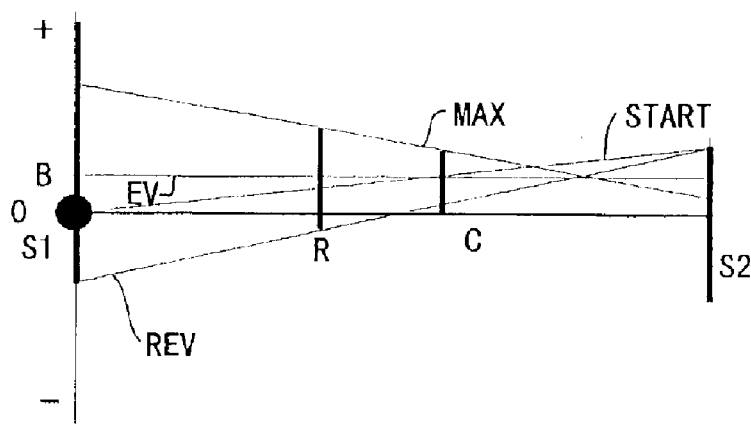

FIGS. 8A and 8B: Embodiment 6 (4 Elements—1 Brake)

FIGS. 8A and 8B show the sixth embodiment, in which the motor-generator MGo, the input In, the output Out, set of the motor-generator MGi and the brake B are connected in the order of rotation speeds to the four elements of the two-freedom-degree, four-element differential mechanism. The ring gear R and the carrier C are shared, and the common carrier C is connected to the engine output shaft Je via the clutch CL, and the rotor shaft Jmi of the motor-generator MGi is braked by the brake B. This embodiment is similar to the foregoing embodiments excepting that the motor-generator MGi cannot rotate in the brake-on state.

Figure 9:
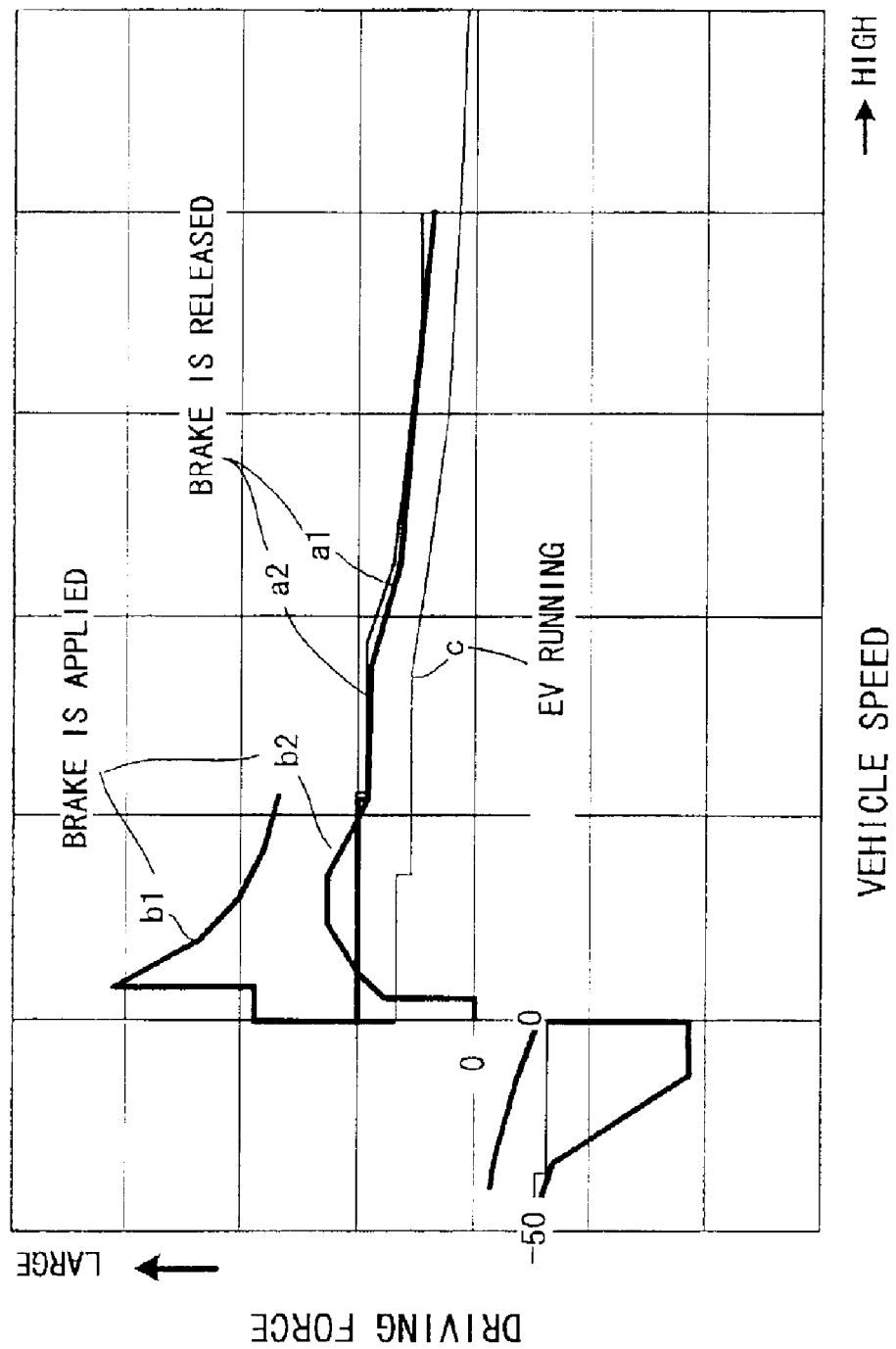
FIG. 9 is a characteristic diagram illustrating the maximum driving force characteristics in the various states according to the sixth embodiment.

FIG. 9 illustrates the driving force characteristics according to this embodiment. The reference characters appearing in FIG. 9 have the same meanings as those of FIG. 3. The ratio of the power through the motor-generators MGi and MGo to the power transmitted by the drive train in the state where the power generation and power consumption are balanced is similar to that of FIG. 2.

FIGS. 10A, 10B to 13A, 13B: Embodiments 7 to 10

Figure 10A:
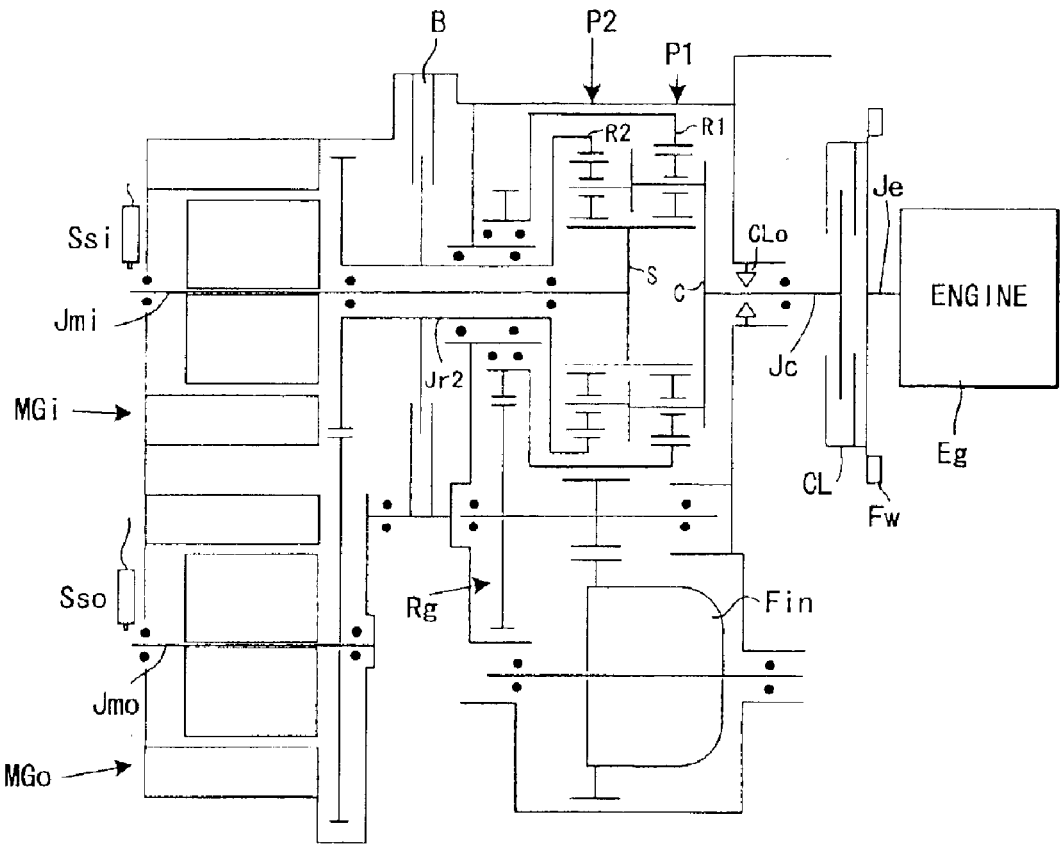
FIG. 10A is a schematic construction diagram of the seventh embodiment of the present invention and FIG. 10B is its alignment chart.
Figure 10B:
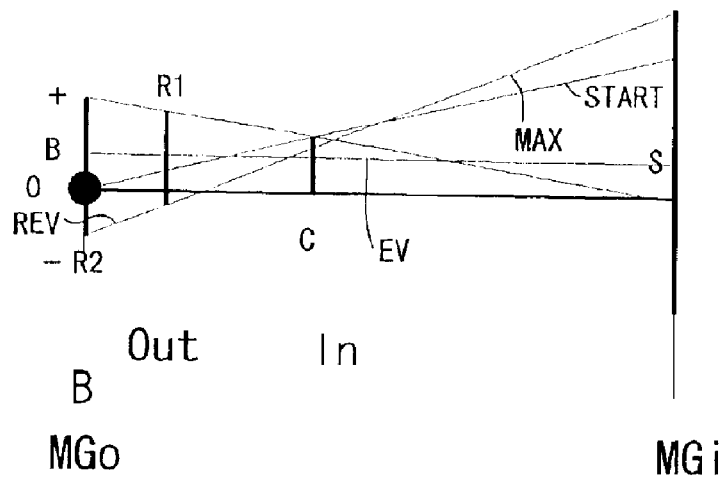
Figure 11A:
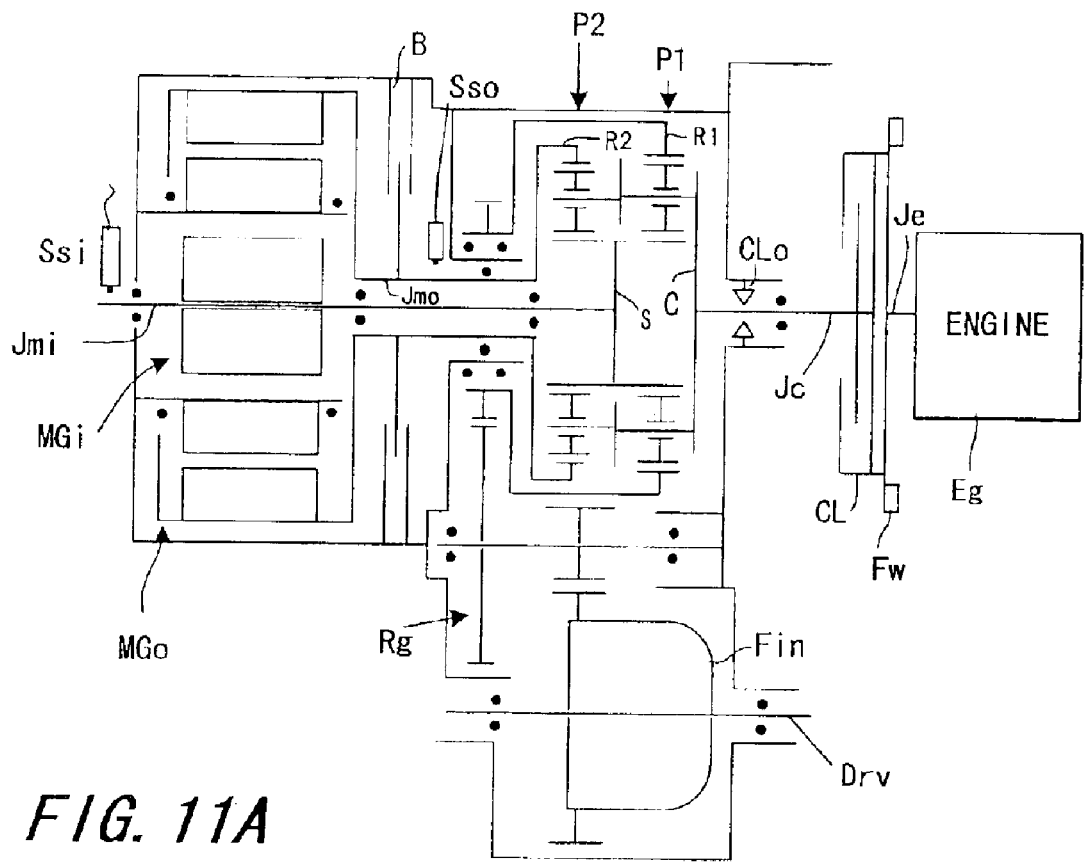
FIG. 11A is a schematic construction diagram of the eighth embodiment of the present invention and FIG. 11B is its alignment chart.
Figure 11B:
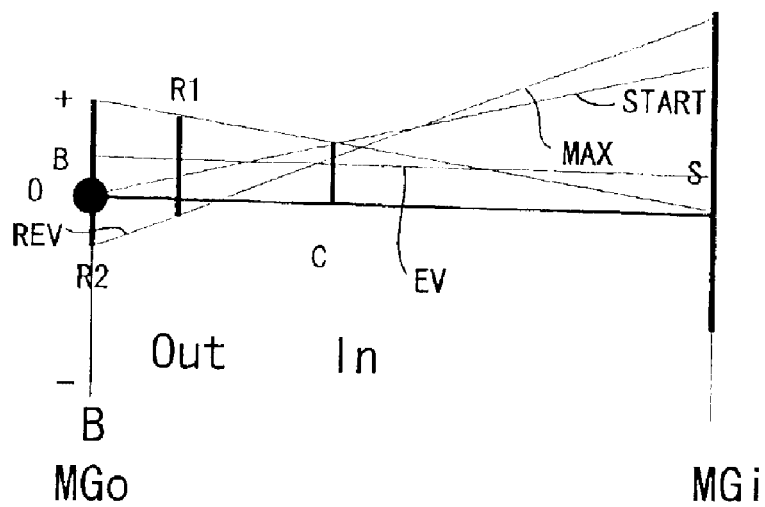

FIGS. 10A, 10B to 13A, 13B show the seventh to tenth embodiments relating to the embodiment of FIGS. 8A and 8B. The embodiments of FIGS. 10A, 10B and 11A, 11B are different from the construction of FIG. 8A in that both the two planetary gear trains P1 and P2 are of a single-pinion type and are provided with ring gears R1 and R2 respectively, and a common sun gear S, and in that the ring gear R2 of the planetary gear train P2 is connected to the second motor-generator MGo and the brake B brakes the rotary shaft Jr2 and outer rotor shaft Jmo. The embodiment of FIGS. 10A and 10B is further different in that the two motor-generators MGo and MGi are independent of each other.

Figure 12A:
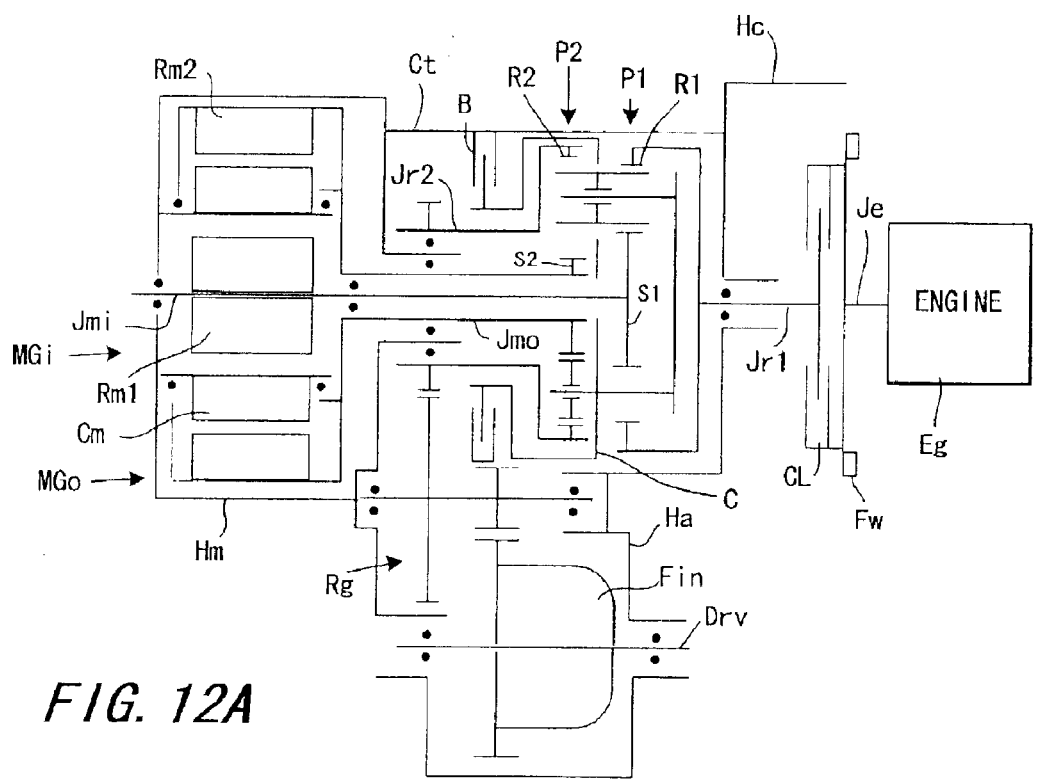
FIG. 12A is a schematic construction diagram of the ninth embodiment of the present invention and FIG. 12B is its alignment chart.
Figure 12B:
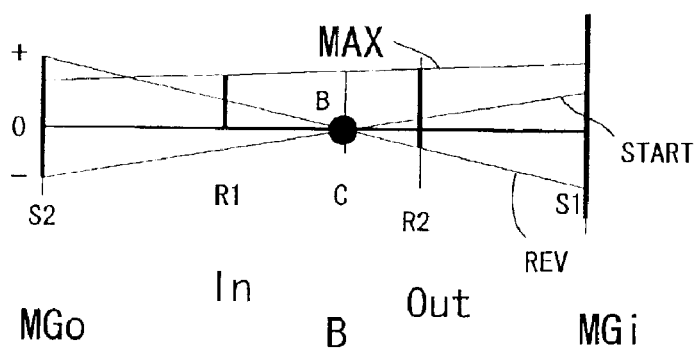
Figure 13A:
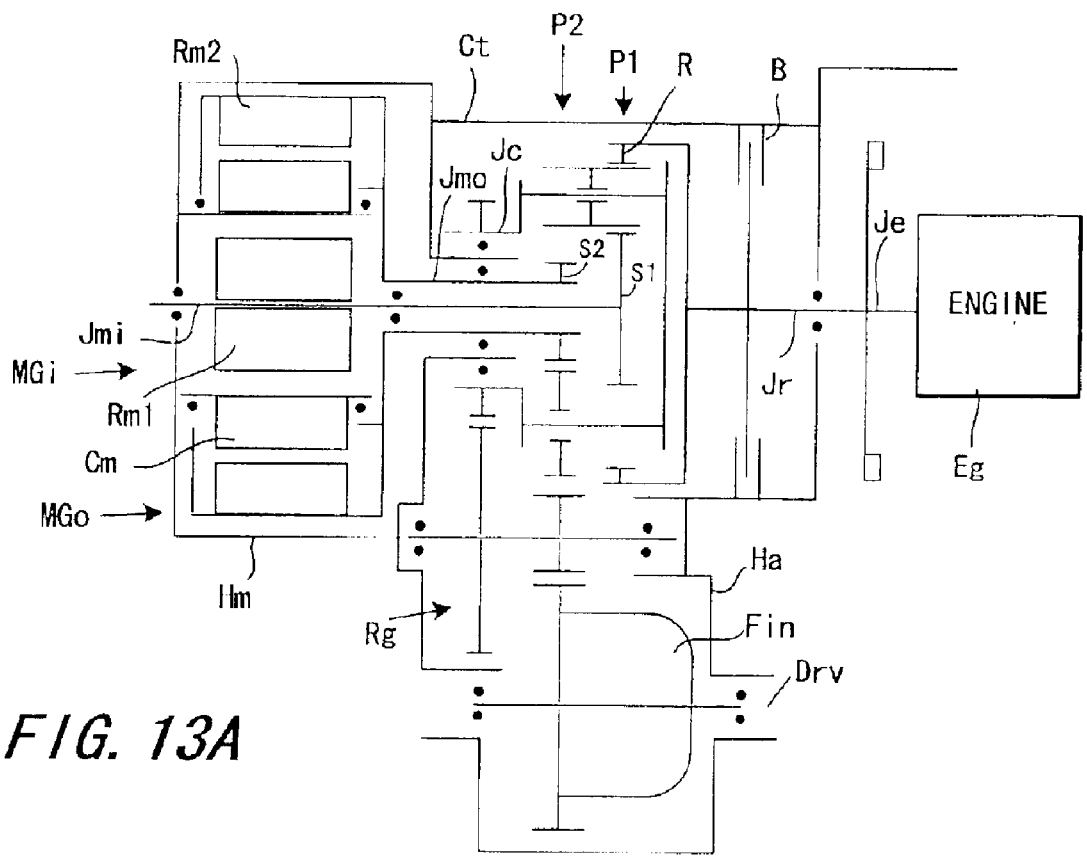
FIG. 13A is a schematic construction diagram of the tenth embodiment of the present invention and FIG. 13B is its alignment chart.
Figure 13B:
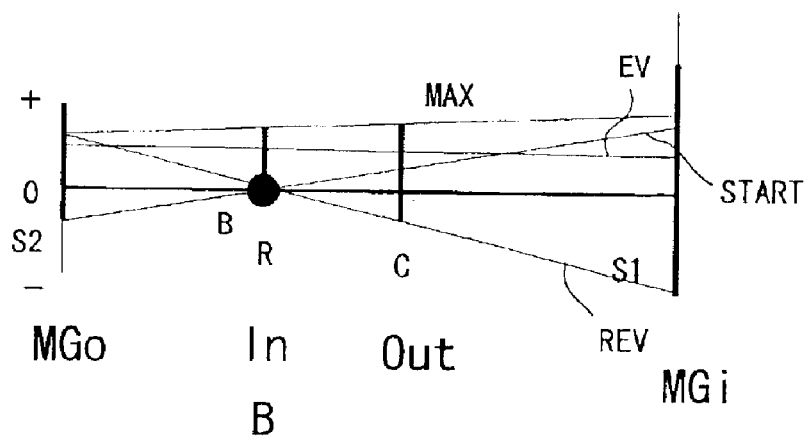

In the embodiment of FIGS. 12A and 12B, the carrier C shared between the first planetary gear train P1 and the second planetary gear train P2 is braked by the brake B. In the embodiment of FIGS. 13A and 13B, the ring gear R shared between the first planetary gear train P1 and the second planetary gear train P2 is braked by the brake B.

Figure 14A:
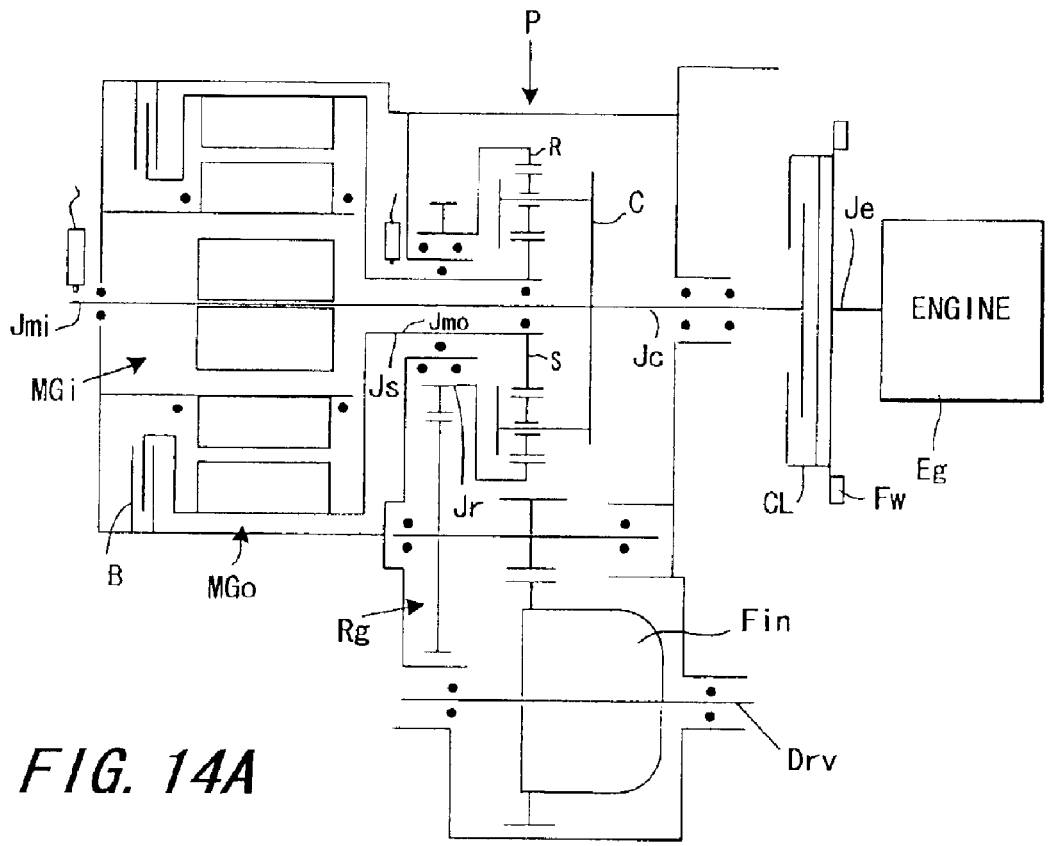
FIG. 14A is a schematic construction diagram of the eleventh embodiment of the present invention and FIG. 14B is its alignment chart.
Figure 14B:
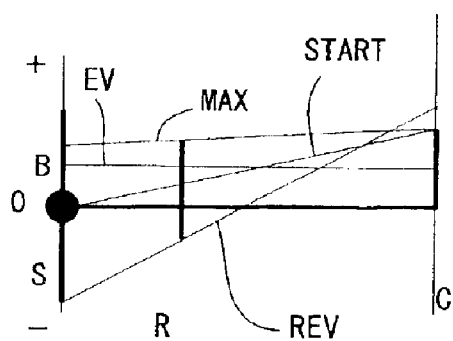

FIGS. 14A and 14B: Embodiment 11 (3 Elements—1 Brake)

FIGS. 14A and 14B show the eleventh embodiment, in which the set of the input In and the motor-generator MGi, the output Out, and the set of the motor-generator MGo and the brake B are connected to the three elements of the two-freedom-degree, three-element differential mechanism in the order of rotation speeds. The sun gear S and the carrier C of the single double-pinion type planetary gear train P are connected to the motor-generators MGo and MGi respectively, and the carrier shaft Jc is connected to the engine output shaft Je via the clutch CL whereas the ring gear shaft Jr is connected to the final reduction mechanism Fin via the reduction gear Rg. The brake B brakes the sun gear shaft Js.

Figure 15:
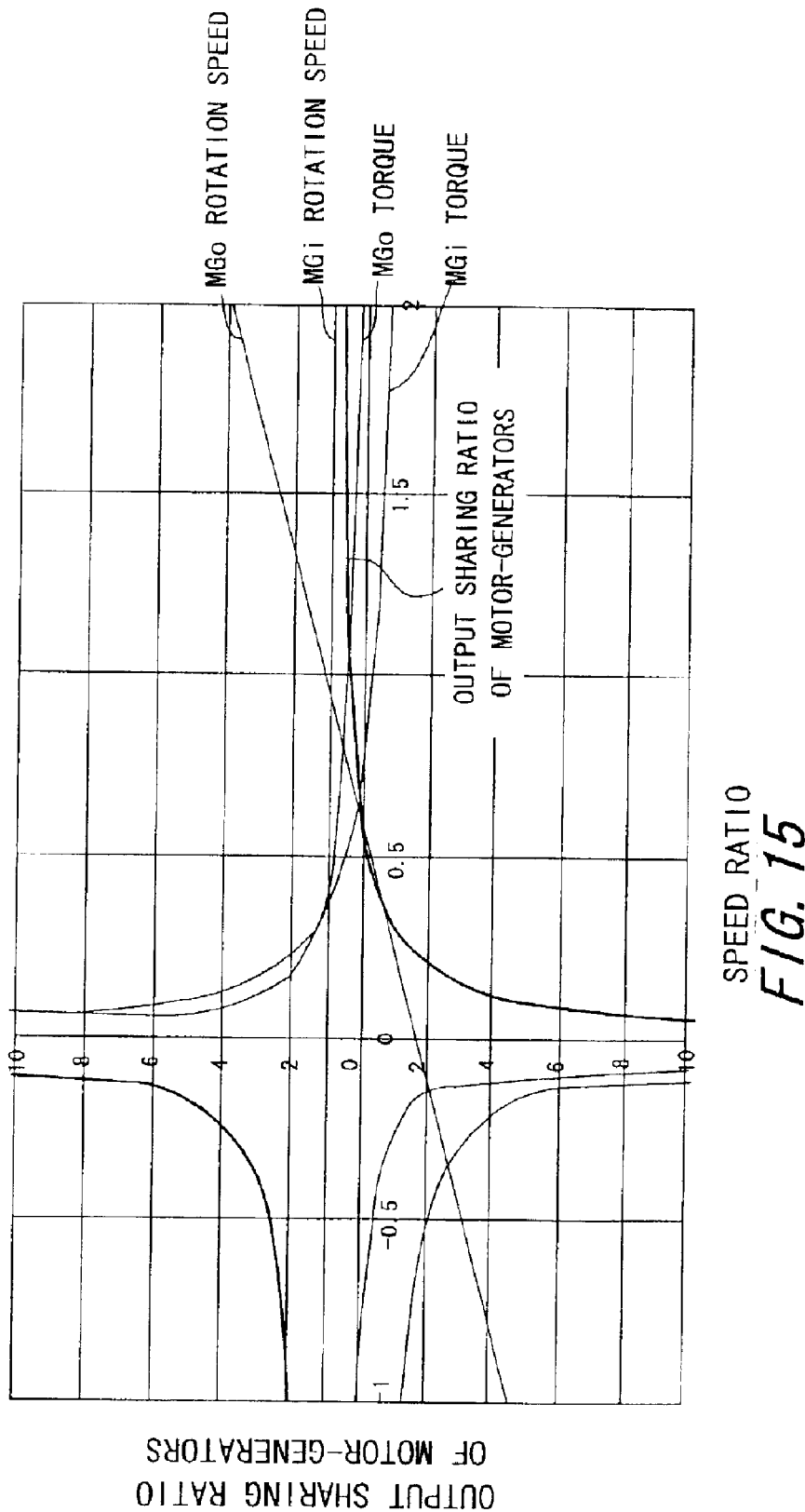
FIG. 15 is a characteristic diagram illustrating the output sharing characteristics of motor-generators according to the eleventh embodiment, against a speed ratio.

This embodiment is similar to the foregoing embodiments excepting that the motor-generator MGo cannot rotate in the brake-on state, and that there is only one drive point at which the power passing through the motor-generator is zero. FIG. 15 illustrates the output sharing ratio of the motor-generators MGo and MGi in the state where the power generation and power consumption are balanced.

FIGS. 16A, 16B to 18A, 18B: Embodiments 12 to 14

Figure 16A:
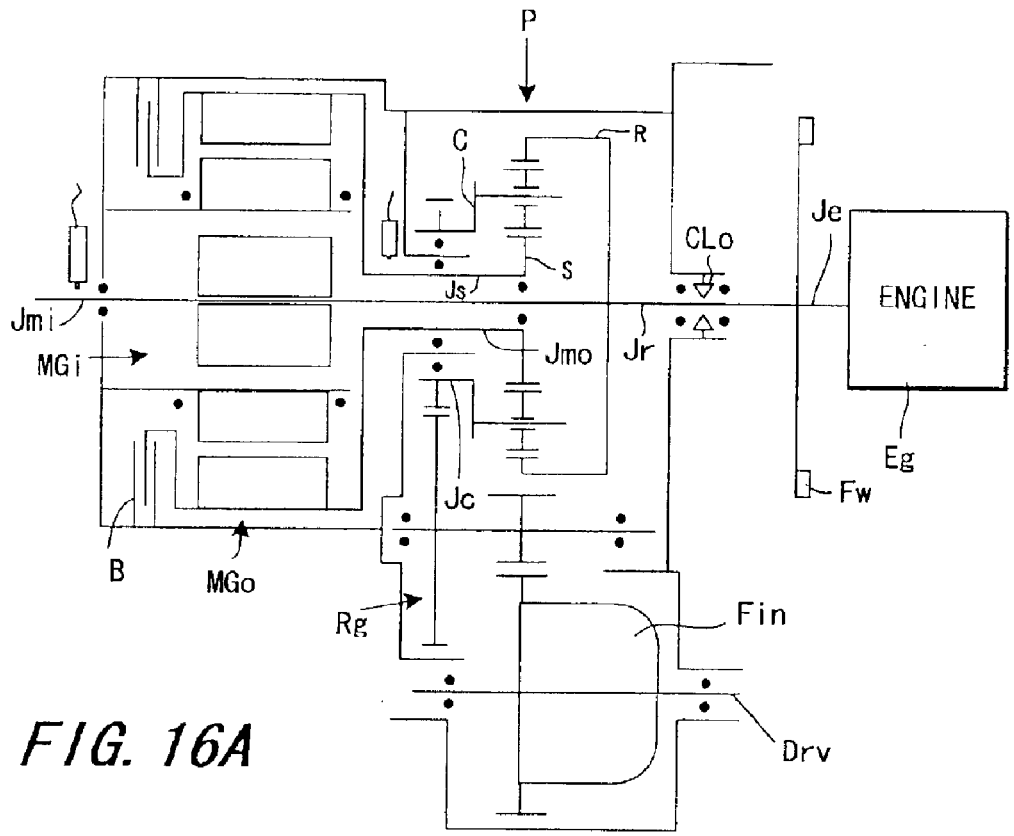
FIG. 16A is a schematic construction diagram of the twelfth embodiment of the present invention and FIG. 16B is its alignment chart.
Figure 16B:
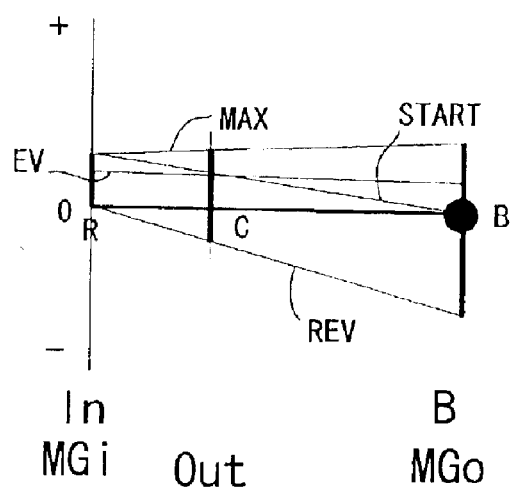

FIGS. 16A, 16B to 18A, 18B show the twelfth to fourteenth embodiments relating to the embodiment of FIGS. 14A and 14B. In the embodiment of FIGS. 16A and 16B, the sun gear S and the ring gear R of the single single-pinion type planetary gear train P are connected to the motor-generators MGo and MGi respectively, the ring gear shaft Jr is connected to the engine output shaft Je, and the carrier shaft Jc is connected to the final reduction mechanism Fin via the reduction gear Rg. The brake B brakes the sun gear shaft Js.

Figure 17A:
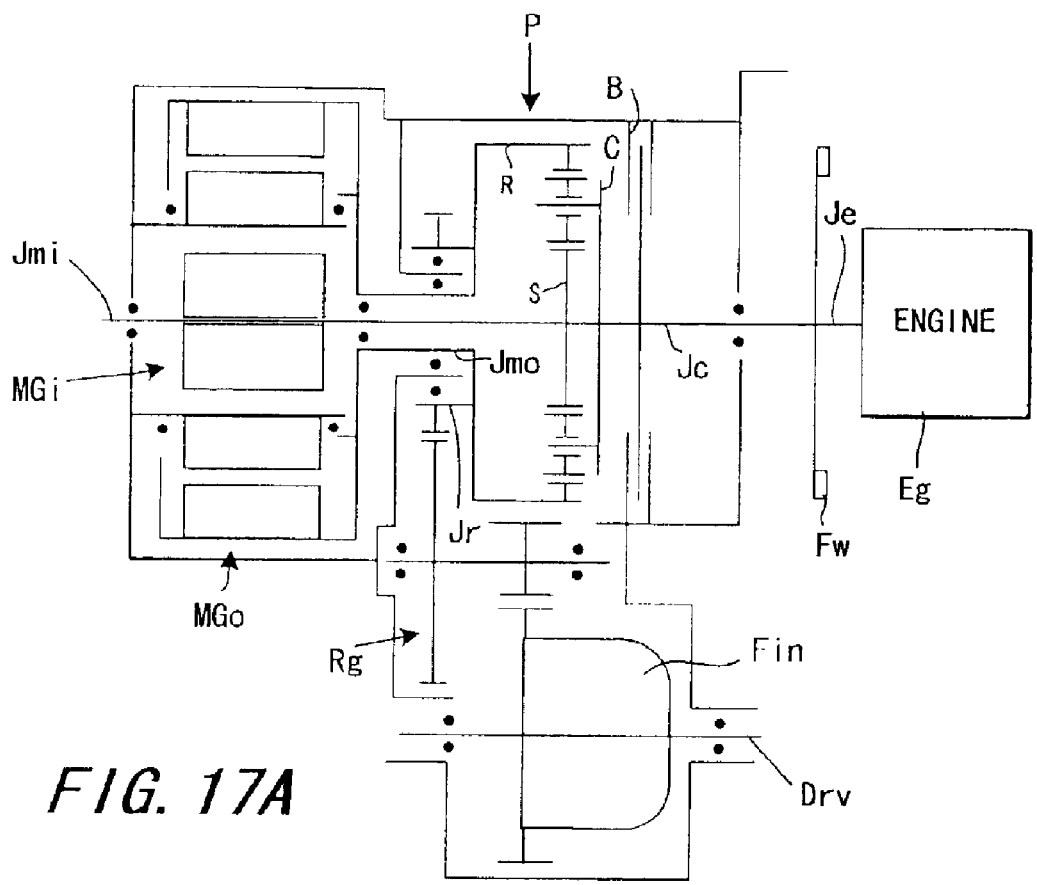
FIG. 17A is schematic construction diagram of the thirteenth embodiment of the present invention and FIG. 17B is its alignment chart.
Figure 17B:
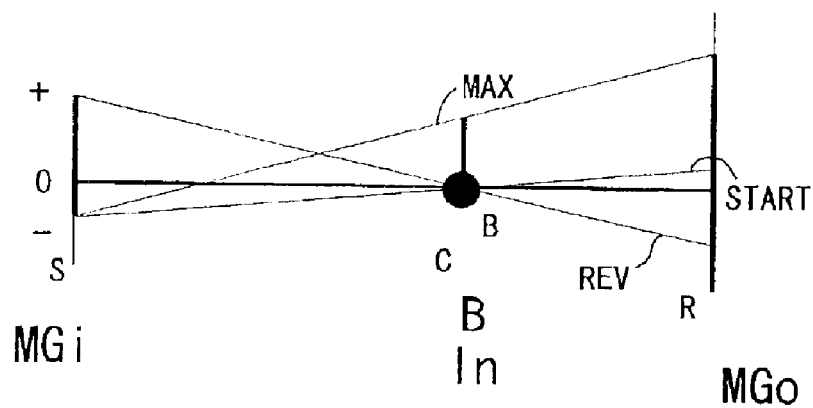

In the embodiment of FIGS. 17A and 17B, the sun gear S and the ring gear R of the planetary gear train P are connected to the motor-generators MGi and MGo respectively, the carrier shaft Jc is connected to the engine output shaft Je, and the ring gear shaft Jr is connected to the final reduction mechanism Fin via the reduction gear Rg. The brake B brakes the carrier shaft Jc.

Figure 18A:
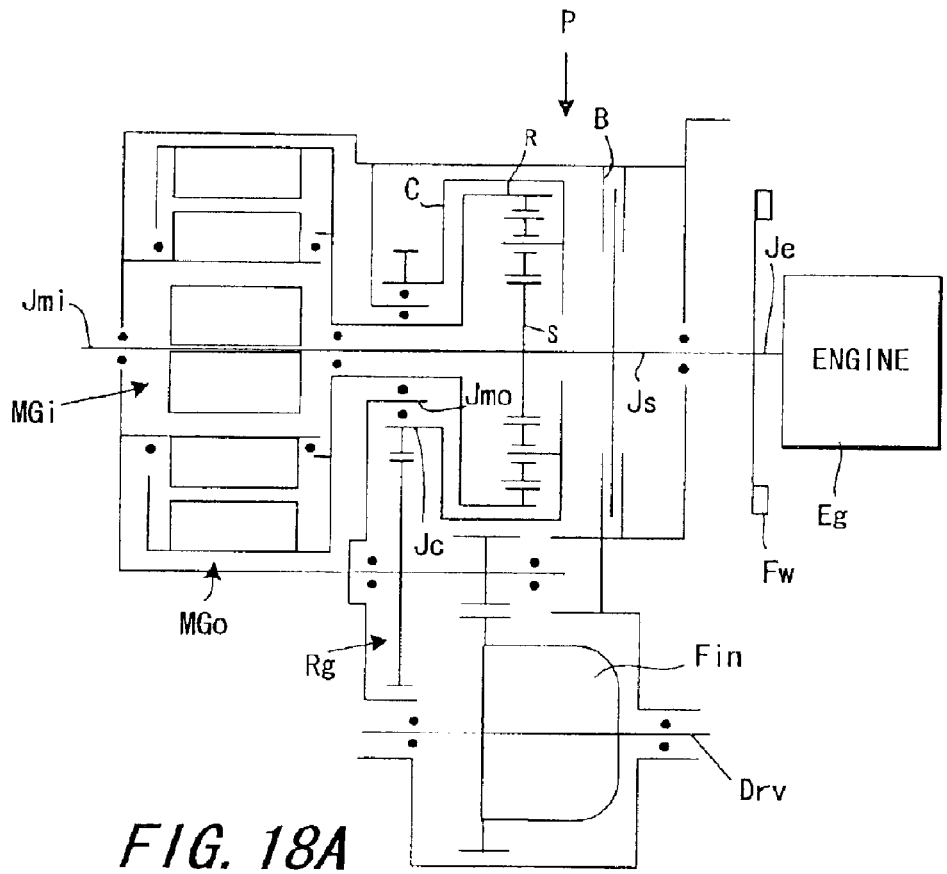
FIG. 18A is a schematic construction diagram of the fourteenth embodiment of the present invention and FIG. 18B is its alignment chart.
Figure 18B:
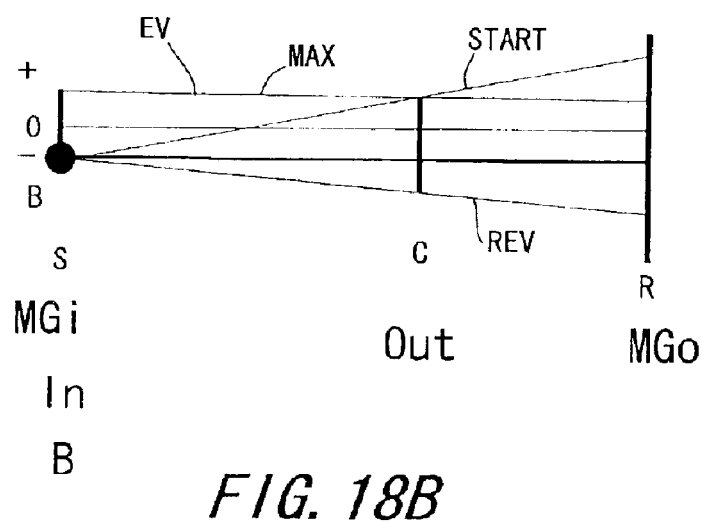

In the embodiment of FIGS. 18A and 18B, the sun gear S and the ring gear R of the planetary gear train P are connected to the motor-generators MGi and MGo respectively, the sun gear shaft Js is connected to the engine output shaft Je, and the carrier shaft Jc is connected to the final reduction mechanism Fin via the reduction gear Rg. The brake B brakes the sun gear shaft Js.

FIGS. 19A, 19B and 20A, 20B: Embodiments 15 and 16 (4 Elements—2 Brakes)

Figure 19A:
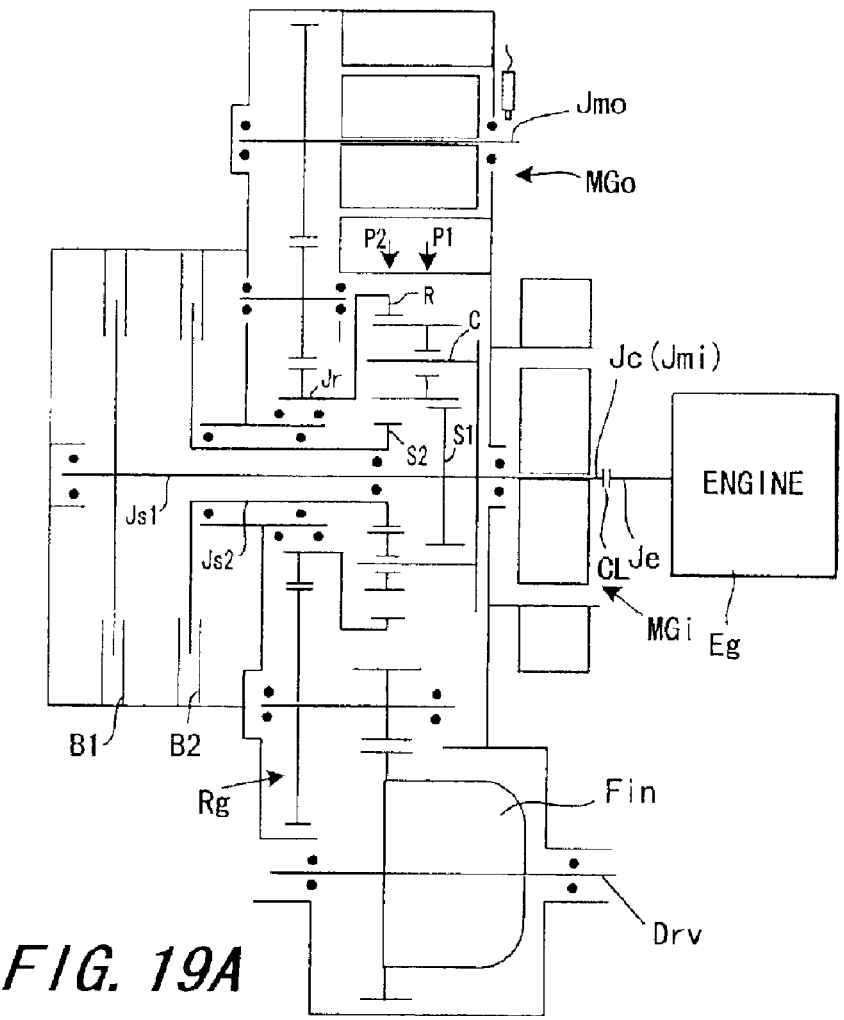
FIG. 19A is a schematic construction diagram of the fifteenth embodiment of the present invention and FIG. 19B is its alignment chart.
Figure 19B:
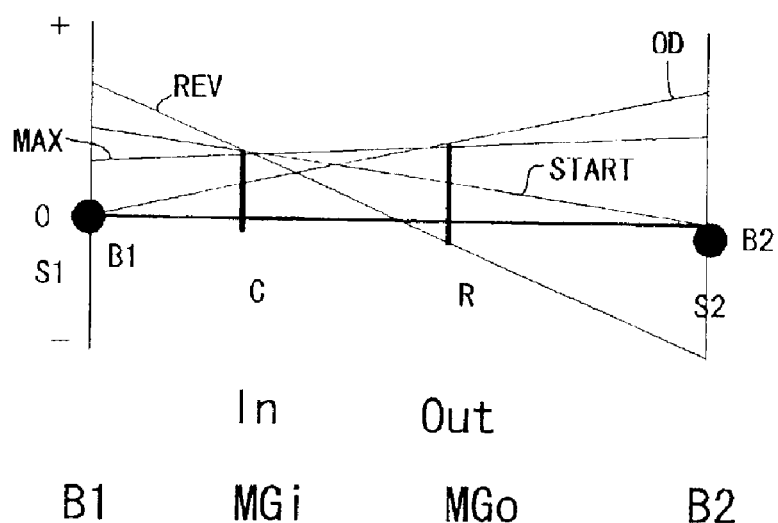

FIGS. 19A and 19B show the embodiment, in which a brake B1, the set of the input In and the motor-generator MGi, the set of the output Out and the motor-generator MGo, and a brake B2 are coupled in the order of rotation speeds to the two-freedom-degree, four-element differential mechanism. The single-pinion type first planetary gear train P1 and the double-pinion type second planetary gear train P2 share the ring gear R and the carrier C, and the carrier shaft Jc is connected to the motor-generator MGi and the engine output shaft Je. The ring gear shaft Jr is connected to the motor-generator MGo and connected to the final reduction mechanism Fin via the reduction gear Rg.

Moreover, the first sun gear shaft Js1 is braked by the first brake B1, and the second sun gear shaft Js2 is braked by the second brake B2. In this embodiment, while the two brakes B1 and B2 are released, the input In and the output Out exert no influence upon each other both in the rotation speeds and torques, so the vehicle functions as the series hybrid vehicle. The vehicle can run at an overdrive fixed speed ratio, when the brake B1 adjacent to the input In is applied, and at a low fixed speed ratio when the brake B2 adjacent to the output Out is applied. If the engine rotation transmission to the carrier shaft Jc can be interrupted by releasing the clutch CL, the vehicle can back at a low fixed speed ratio using the two motor-generators MGi and MGo.

By eliminating the brake B1 and the sun gear S1 to which the brake B1 is applied, the drivetrain is constructed such that the set of the input and the motor-generator, the set of the output and the motor-generator, and the brake are connected in the order of rotation speeds to the two-freedom-degree, three-element differential mechanism. The operation of this case is similar to the aforementioned one except for the absence of the aforementioned overdrive fixed speed ratio.

Figure 20A:
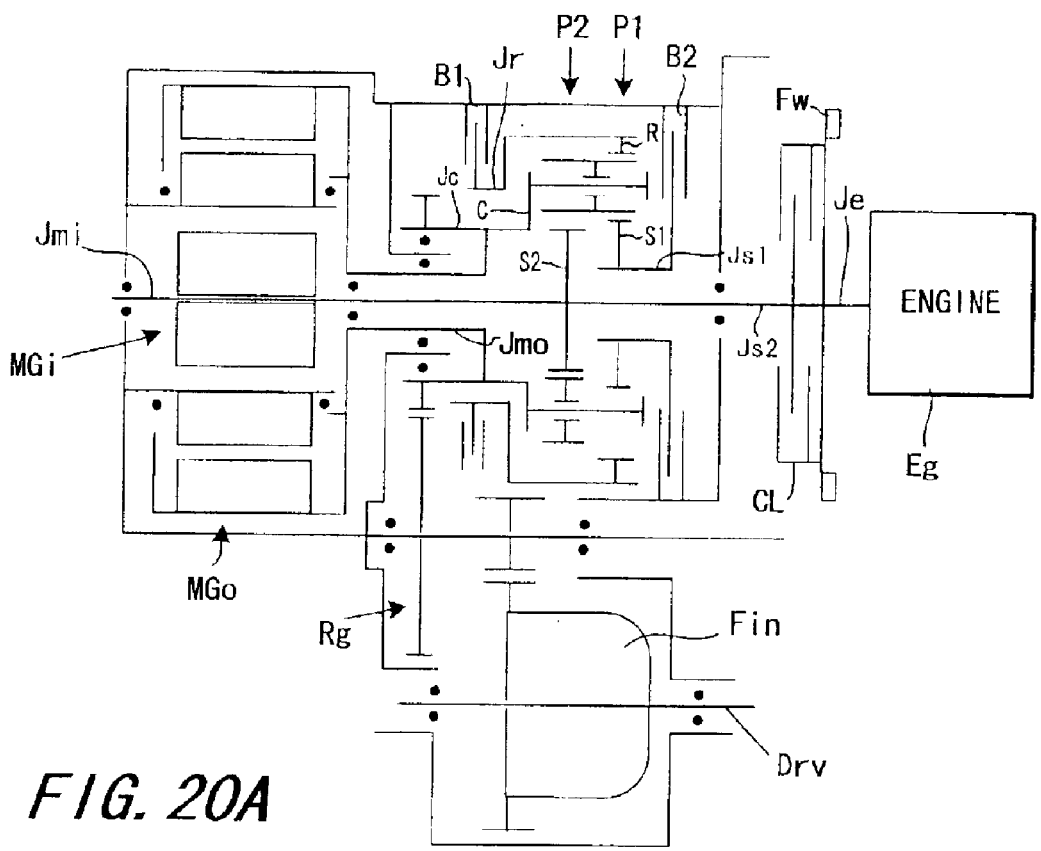
FIG. 20A is a schematic construction diagram of the sixteenth embodiment of the present invention and FIG. 20B is its alignment chart.
Figure 20B:
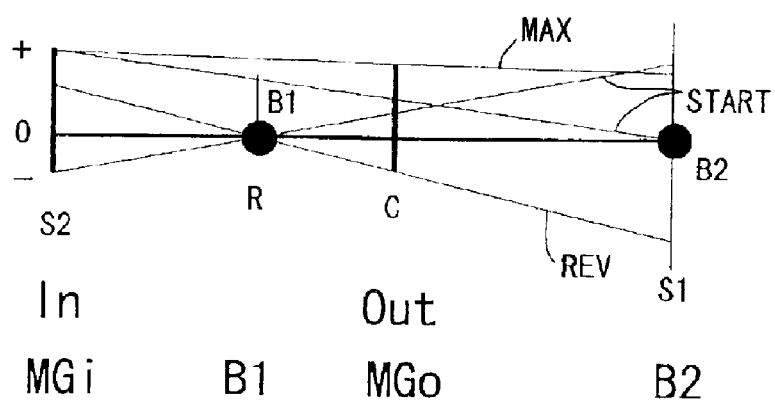

FIGS. 20A and 20B show an embodiment relating to the aforementioned embodiment of FIGS. 19A and 19B. In this embodiment, the set of the input In and the motor-generator MGi, the brake B1, the set of the output Out and the motor-generator MGo, and the brake B2 are coupled in the order of rotation speeds. The first planetary gear train P1 and the second planetary gear train P2 share the ring gear R and the carrier C. The carrier shaft Jc is connected to the motor-generator MGo and connected to the final reduction mechanism Fm via the reduction gear Rg. The second sun gear shaft Js2 is connected to the engine output shaft Je via the clutch CL and connected to the motor-generator MGi. In this construction, the brake B1 brakes the ring gear shaft Jr and the second brake B2 brakes the first sun gear shaft Js1.

In this embodiment, the low fixed speed ratio can be established by applying the brake B1 or B2, and the vehicle can back at a fixed low speed ratio if the brake B1 is applied.

The inventions supported by the above-mentioned embodiments are as follows:

In the first invention, there is provided the drivetrain including the differential mechanism having four or more input/output elements and two degrees of freedom. The input from the engine, the output to the drive shaft, and the two motor-generators are assigned to the elements respectively, and the elements other than the element to which the output is assigned are provided with the brake.

According to the second invention, in the first invention, the motor-generator, the input, the output and the motor-generator are assigned in order of the rotation speeds of the elements. Here, the order of the rotation speeds is the order of arraying the elements in the alignment chart.

According to the third invention, the first invention is such that the element adjacent to the element to which the output assigned is provided with the brake.

According to the fourth invention, the first to third inventions are such that the motor-generator, the input, the output, and the set of the motor-generator and the brake are assigned to the four elements of the four-element differential mechanism in order of rotation speeds.

According to the fifth invention, the first to third inventions are such that the motor-generator, the input, the output, the brake, and the motor-generator are assigned to the five elements of the five-element differential mechanism in the order of rotation speeds.

According to the sixth invention, the first to third inventions are such that the motor-generator, the input, the brake, the output, and the motor-generator are assigned to the five elements of the five-element differential mechanism in order of rotation speeds.

According to the seventh invention, the first to third inventions are such that the clutch is interposed between the engine and the element to which the input is assigned.

In the eighth invention, there is provided the drivetrain including the differential mechanism having three or more elements and two degrees of freedom. The input from the engine, the output to the drive shaft, and the two motor-generators are so assigned that the input and the output, and the two motor-generators may not be coupled to the same elements. The element to which the input is assigned is provided with the brake.

According to the ninth invention, the eighth invention is such that the motor-generator, the set of the input and the brake, and the set of the output and the motor-generator are assigned to the three elements of the three-element differential mechanism in order of rotation speeds.

According to the tenth invention, the eighth invention is such that the set of the motor-generator, the input and the brake, the output, and the motor-generator are assigned to the three elements of the three-element differential mechanism in order of rotation speeds.

According to the eleventh invention, the first to third and the eighth inventions are such that the motor-generator, the set of the input and the brake, the output, and the motor-generator are assigned to the four elements of the four-element differential mechanism in order of rotation speeds.

In the twelfth invention, the input from the engine and the output to the drive shaft are assigned to the mutually different elements of the differential mechanism including three or more elements and having two degrees of freedom. The motor-generators are assigned to both the input and the output. One of the elements other than the elements to which the input and the output assigned is provided with the brake.

According to the thirteenth invention, the twelfth invention is such that the set of the input and the motor-generator, the set of the output and the motor-generator, and the brake are assigned to the three elements of the three-element differential mechanism in the order of rotation speeds.

According to the fourteenth invention, the twelfth invention is such that the brake, the set of the input and the motor-generator, and the set of the output and the motor-generator are assigned to the three elements of the three-element differential mechanism in order of rotation speeds.

According to the fifteenth invention, the twelfth invention is such that the brake, the set of the input and the motor-generator, the set of the output and the motor-generator, and the brake are assigned to the four elements of the four-element differential mechanism in order of rotation speeds.

According to the sixteenth invention, the twelfth invention is such that the set of the input and the motor-generator, the brake, the set of the output and the motor-generator, and the brake are assigned to the four elements of the four-element differential mechanism in order of rotation speeds.

According to the seventeenth invention, the set of the input and the motor-generator, the output, and the set of the motor-generator and the brake are assigned to three elements of the differential mechanism having three or more elements in order of rotation speeds.

According to the eighteenth invention, the first, eighth, twelfth and seventeenth inventions are such that the brake is applied when a necessary driving force increases.

According to the nineteenth invention, the first, eighth, twelfth and seventeenth inventions are such that in accordance with a rise in the vehicle speed when the brake is applied, the driving force generated by the motor-generator is lowered to reduce the braking force substantially to zero thereby to reduce the driving force variation at the timing the brake is released.

According to the twentieth invention, the first, eighth, twelfth and seventeenth inventions are such that the differential mechanism is constructed of the planetary gear mechanism.

According to the twenty-first invention, the planetary gear mechanism of the twentieth invention includes the single-pinion type first planetary gear train and the double-pinion type second planetary gear train, any two elements of the sun gears, carriers and ring gears of which are shared to construct the two-freedom-degree differential mechanism.

In the first invention, if the speeds of any two elements of the differential mechanism of the two-freedom-degree having the four or more elements are determined, the speeds of the remaining elements are determined. In this differential mechanism, a large reduction ratio between the power source and the drive shaft can be achieved by providing the element other than the elements to which the output to the drive shaft is assigned with the brake to brake the other element. Thus, the startability can be improved without increasing the capacities of the motor-generators. This two-freedom-degree differential mechanism can be constructed by the planetary gear mechanism, as disclosed as the twentieth or twenty first invention.

In the second invention, two drive points exist where the power passing through the motor-generators becomes zero. Between these two drive points, the power passing through the motor-generators can be reduced to about one half to one third of the power passing through the drivetrain. A large driving force can be generated by applying the brake at the low vehicle speed, so the driving force necessary from the low speed to the high speed can be generated by using the motor-generators having a capacity of about the maximum of the power passing through the motor-generators within such a range between the two drive points.

In the third invention, a large speed ratio can be achieved by applying the brake, so a large driving force on the low vehicle speed side can be achieved.

In the fourth invention, the differential mechanism can be constructed of four elements, so the drivetrain can be downsized.

In the fifth invention, a large speed ratio can be achieved by applying the brake, so a large driving force can be easily obtained.

In the sixth invention, a large speed ratio can be achieved when the output rotation is in the reverse direction, so a large driving force can be obtained when the vehicle backs.

In the seventh invention, the engine can be decoupled by the clutch so that the vehicle can run only on the motor-generators and the efficiency in the EV running can be improved. During the EV running, a large driving force can be generated by applying the brake. If the vehicle is moved forward or backward with the same brake being applied, however, the input element is reversed for the forward or backward run. In such a case, the engine can be prevented from rotating in a reverse direction by releasing the clutch.

In the eighth invention, the same brake is applied for the forward and backward running to generate a large driving force in the EV running. The input shaft is stopped for both forward and backward running, so any mechanism for preventing the reverse rotation of the engine can be omitted.

In the ninth invention, in addition to the effect of the eighth invention, the differential mechanism can be made of one planetary gear train, so the drivetrain can be downsized.

In the tenth invention, in addition to the effect of the eighth invention, the differential mechanism can be made of one planetary gear train, so the drivetrain can be downsized.

In the eleventh invention, the effects of the first to third and eighth inventions can be obtained by an apparatus of a smaller size.

In the twelfth invention, in the brake-off state, the vehicle can be driven as a series hybrid vehicle and can be driven in the brake-on state not as a result of transmitting the power through the motor-generators but mechanically at a constant speed ratio, so that high efficient drive can be made.

In the thirteenth invention, in addition to the effect of the twelfth invention, the constant speed ratio can be set to a lower speed ratio so that a large driving power can be generated.

In the fourteenth invention, in addition to the effect of the twelfth invention, the constant speed ratio can be set to an overdrive side (larger side) so that the gas mileage can be improved.

In the fifteenth invention, it is possible to achieve effects similar to those of the twelfth, thirteenth and fourteenth inventions.

In the sixteenth invention, in addition to the effects of the twelfth and thirteenth inventions, a large driving force can be generated at a constant speed ratio even when reverse running.

In the seventeenth invention, three differential elements are provided and the transmission mechanism can be downsized since it is constructed of one planetary gear mechanism.

In the eighteenth invention, when large driving force is required at low vehicle speed, the driving force can be generated at a fixed low speed ratio with at least one torque of the engine and the two motor-generators so that a large driving force can be obtained.

In the nineteenth invention, the driving force makes little change at the timing of releasing the brake.

The entire contents of Japanese Patent Applications P2001-221226 (filed Jul. 23, 2001) and P2001-221222 (filed Jul. 23, 2001) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A drivetrain for transmitting driving force from an output shaft of an engine to a drive shaft of a vehicle, comprising:

a composite planetary gear mechanism including a single-pinion planetary gear train and a double-pinion planetary gear train, the single pinion planetary gear train having a sun gear, pinions, a carrier and a ring gear connected to the output shaft of the engine, the double pinion planetary gear having a sun gear, inner pinions, outer pinions and a ring gear connected to the drive shaft, the two planetary gear trains sharing carriers and sharing pinions of the single-pinion planetary gear train and inner pin ions of the double-pinion planetary gear train to construct a two-freedom-degree, five-element differential mechanism, a first motor-generator connected to the sun gear of the single-pinion planetary gear train, a second motor-generator connected to the sun gear of the double-pinion planetary gear train, and a brake which brakes the carrier of the two planetary gear train.

2. A drivetrain as defined in claim 1, further comprising a clutch arranged between the output shaft of the engine and the ring gear of the single-pinion planetary gear train.

* * * * *